United States Patent
Jain et al.

(10) Patent No.: US 6,185,318 B1
(45) Date of Patent: *Feb. 6, 2001

(54) SYSTEM AND METHOD FOR MATCHING (FINGERPRINT) IMAGES AN ALIGNED STRING-BASED REPRESENTATION

(75) Inventors: Anil K. Jain, Okemos; Lin Hong, Lansing, both of MI (US); Rudolf Maarten Bolle, Bedford Hills; Sharathchandra Umapathirao Pankanti, Mt. Kisco, both of NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/030,435

(22) Filed: Feb. 25, 1998

Related U.S. Application Data

(60) Provisional application No. 60/056,677, filed on Aug. 22, 1997.

(51) Int. Cl.[7] .................................................. G06K 9/00
(52) U.S. Cl. .......................... 382/125; 382/115; 382/124; 382/195
(58) Field of Search .................................. 382/115, 124, 382/125, 204, 209, 173, 199, 195, 260

(56) References Cited

U.S. PATENT DOCUMENTS

| | | | |
|---|---|---|---|
| 4,151,512 | 4/1979 | Riganati et al. | 382/125 |
| 4,310,827 | 1/1982 | Asai | 382/125 |
| 4,641,349 | * 2/1987 | Flom et al. | 382/2 |
| 4,817,183 | 3/1989 | Sparrow | 382/204 |
| 5,140,642 | 8/1992 | Hsu et al. | 382/124 |
| 5,493,621 | * 2/1996 | Matsumura | 382/127 |
| 5,524,161 | * 6/1996 | Omori et al. | 382/125 |
| 5,631,972 | * 5/1997 | Ferris et al. | 382/125 |
| 6,038,334 | * 3/2000 | Hamid | 382/115 |
| 6,041,133 | * 3/2000 | Califano et al. | 382/115 |

OTHER PUBLICATIONS

N. K. Ratha, S. C. Chen and A. K. Jain, "Adaptive Flow Orientation Based Feature Extraction in Fingerprint Images", Journal of Pattern Recognition, vol. 28, No. 11, pp. 1657, Nov. 1995.

N. Ratha, K. Karu, S. Chen and A. K. Jain, A Real–time Matching System for Large Fingerprint Database, IEEE Transactions on Pattern Analysis and Machine Intelligence, vol. 18, No. 8, pp. 799–813, 1996.

* cited by examiner

Primary Examiner—Matthew C. Bella
Assistant Examiner—Sheela Chawan
(74) Attorney, Agent, or Firm—Louis J. Percello; Perman & Green, LLP

(57) ABSTRACT

The invention is a system and method for matching a two dimensional pattern of lines, e.g. a fingerprint, by creating a one dimensional representation of one or more points (e.g., minutiae) on the lines in the patterns to be matched. The one dimensional representations are created by finding a corresponding reference point (minutiae) in each of the patterns and creating an index of other points in each of the respective patterns with respect to the reference point (minutiae). The indexes are adaptively compared taking into account the elastic distortions of the lines.

11 Claims, 19 Drawing Sheets

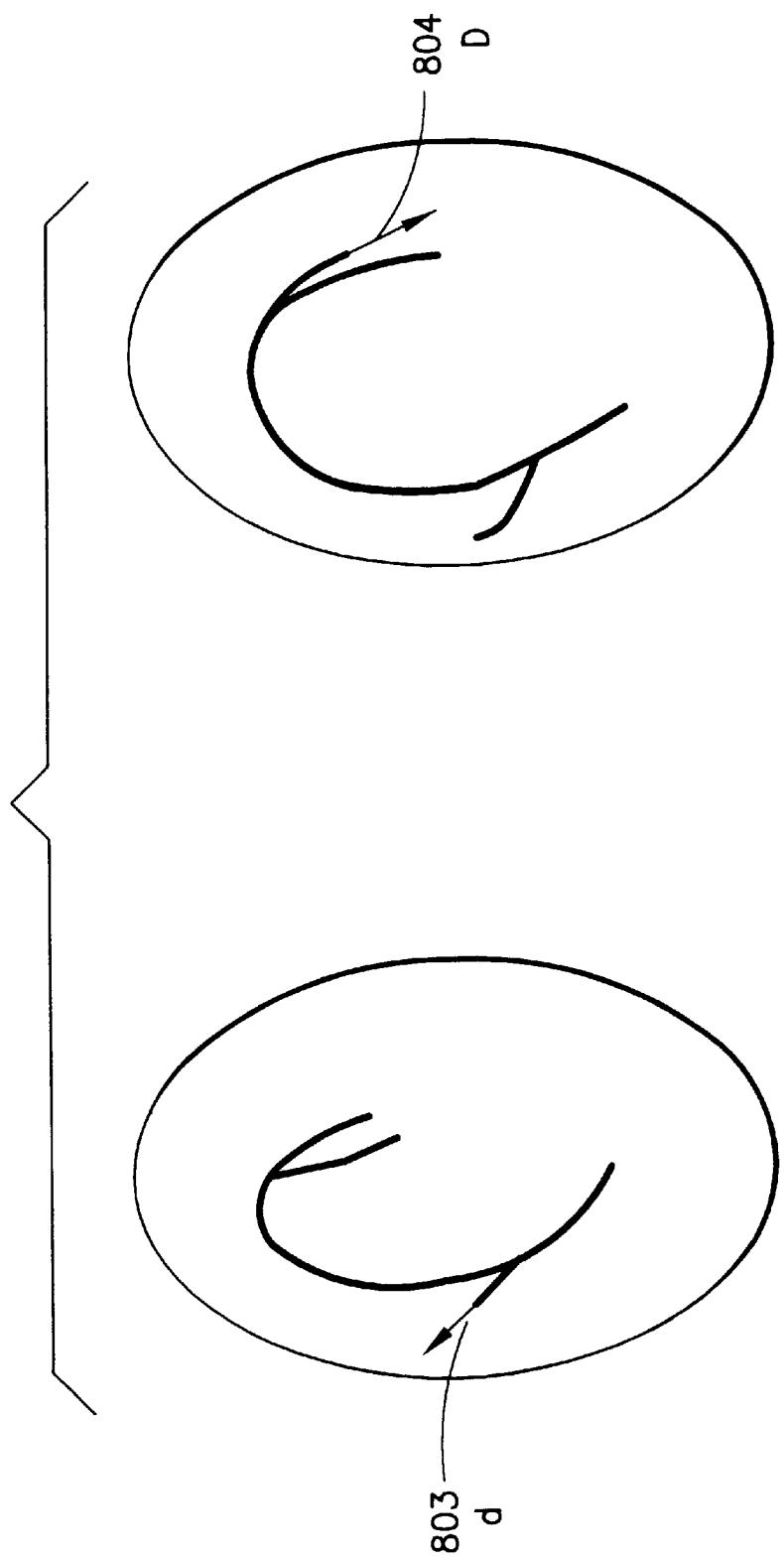

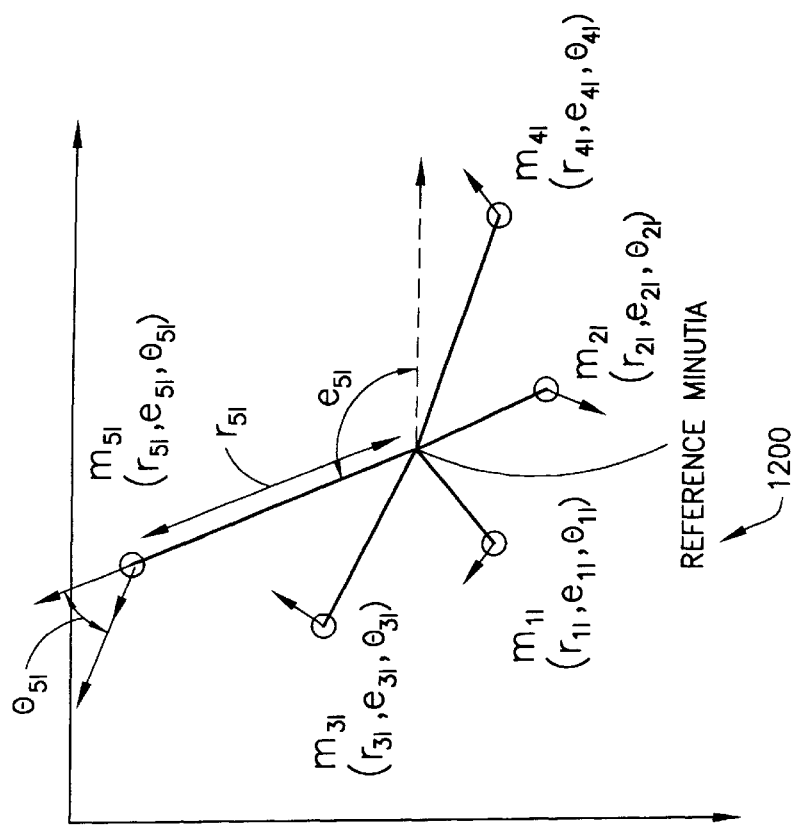
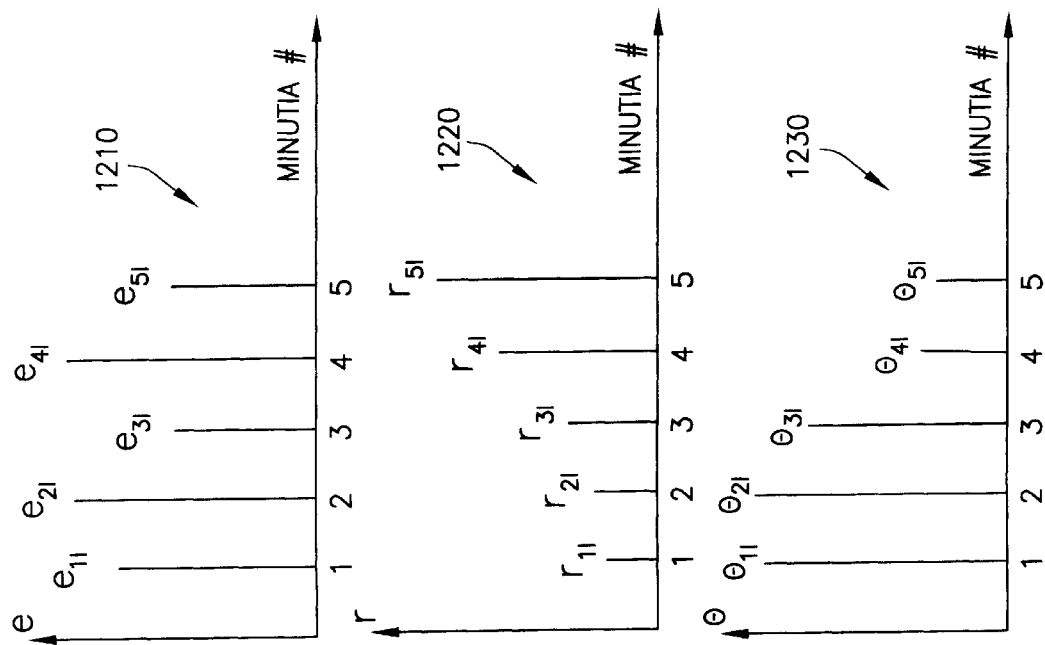
FIG. 12

SYSTEM AND METHOD FOR MATCHING (FINGERPRINT) IMAGES AN ALIGNED STRING-BASED REPRESENTATION

This patent claims priority to provisionally filed patent application No. 60/056,677 filed on Aug. 22, 1997.

RELATED PATENT APPLICATIONS

U.S. Patent Applications Numbered 722,714 entitled SYSTEM AND METHOD FOR DETERMINING THE QUALITY OF FINGERPRINT IMAGES to Bolle et al., 735,718 entitled SYSTEM AND METHOD FOR DETERMINING IF A FINGERPRINT IMAGE CONTAINS A SMUDGED IMPRESSION to Bolle et al., 735,721 entitled SYSTEM AND METHOD FOR DETERMINING IF A FINGERPRINT IMAGE CONTAINS A DRY IMPRESSION to Bolle et al., 735,541 entitled SYSTEM AND METHOD FOR DETERMINING IF A FINGERPRINT IMAGE CONTAINS A PARTIAL PRINT to Bolle et al., 06/034,268 entitled SYSTEM AND METHOD USING MINUTIAE PRUNING FOR FINGERPRINT IMAGE PROCESSING to Bolle et al., 06/032,713 entitled SYSTEM AND METHOD FOR DETERMINING RIDGE COUNTS IN FINGERPRINT IMAGE PROCESSING to Bolle et al., 837,069 entitled SYSTEM AND METHOD FOR DISTORTION CONTROL IN LIVE-SCAN INKLESS FINGERPRINT IMAGES to Bolle et al., are herein incorporated by reference in their entirety.

FIELD OF THE INVENTION

This invention relates to the field of image processing. More specifically, the invention relates to a system and method for processing and matching fingerprint images.

BACKGROUND OF THE INVENTION

There exist systems for accomplishing automatic authentication or identification of a person using his/her fingerprint. A fingerprint of a person comprises a distinctive and unique ridge pattern structure. For authentication or identification purposes, this ridge pattern structure can be characterized by endings and bifurcations of the individual ridges. These features are popularly known as minutiae.

An example of a portion of a fingerprint is shown in FIG. 1A. The minutiae for the fingerprint shown in FIG. 1A are shown in FIG.1B as being enclosed by "boxes." For example, box 101B shows a bifurcation minutiae of a bifurcated ridge 101A and box 103B shows a ridge ending minutiae of ridge 103A. Note that minutiae on the ridges in fingerprints have directions (also called orientations) 105 associated with them. The direction 113B of a minutiae at a ridge end 103B is the direction in which the end of the ridge points. The direction 111B of a bifurcation minutiae 101B is the direction in which the bifurcated ridge points. Minutiae also have locations which are the positions, with respect to some coordinate system, of the minutiae on the fingerprint.

FIG. 2 is a flow chart showing the steps generally performed by a typical prior art system 200.

In step 210, the image is acquired. This acquisition of the image could either be through a CCD camera and framegrabber interface or through a document scanner communicating with the primary computing equipment.

Once the image is acquired into the computer memory or onto disk, relevant minutia features are extracted (220). Not all of the features thus extracted are reliable; some of the unreliable features are optionally edited or pruned (step 230), e.g., manually. The resultant reliable features are used for matching the fingers (step 240).

The fingerprint feature extraction 220, pruning 230, and matching system 240 constitute the primary backbone 250 of a typical minutiae-based automatic fingerprint identification systems (AFIS). The matching results are typically verified by a human expert (step 260). The verification may also be performed automatically. The following reference describes examples of the state of the prior art for feature extraction:

Nalini K. Ratha and Shaoyun Chen and Anil K. Jain, Adaptive flow orientation based feature extraction in fingerprint images, Journal of Pattern Recognition, vol. 28, no. 11, pp. 1657–1672, November, 1995.

This reference is herein incorporated by reference in its entirety.

FIG. 3A is a flow chart showing the prior art steps performed by a feature extraction process 220 that are similar to some of the feature extraction methods proposed by Ratha, Jain, and Chen in the article incorporated above.

It is often not desirable to directly use the input fingerprint image for feature extraction. The fingerprint image might need an enhancement or preprocessing before one could further extract minutiae. Typically, a smoothing process is employed to reduce the pixel-wise noise (step 305).

After the preprocessing stages, prior art systems find the directions of the ridge flow (step 310). The next important step in the processing is finding the exact location of the finger in the image. To accomplish this, a process referred to as the foreground/background segmentation (step 315) separates the finger part of the image from the background part of the image. Once the finger part is localized, i.e., segmented to define its location, the next step is to extract the ridges from the finger image (step 320). The ridges thus extracted are thick and might contain some noisy artifacts which do not correspond to any meaningful structures on the finger. These small structures, i.e., the noisy artifacts, can be safely removed and the longer structures are smoothed (step 325). The longer structures are thinned to one-pixel width and then processed to remove any other artifacts using morphological operators (step 330). The locations and orientations of ridge endings and bifurcations are then extracted from the thinned structures (step 335) to obtain the minutiae. In some systems, a "cleanup" or postprocessing 340 is performed. Here undesirable minutiae are removed based on certain criteria.

One of the prevalent methods of fingerprint authentication and identification methods is based on minutiae features. These systems need to process the fingerprint images to obtain accurate and reliable minutiae features to effectively determine the identity of a person.

The following reference describes examples of the state of the prior art fingerprint matcher:

N. Ratha, K. Karu, S. Chen and A. K. Jain, A Real-time Matching System for Large Fingerprint Database, IEEE Transactions on Pattern Analysis and Machine Intelligence, Volume 18, Number 8, pages 799–813, 1996.

This reference is herein incorporated by reference in its entirety.

Given two (input and template) sets of features originating from two fingerprints, the objective of the feature matching system is to determine whether or not the prints represent the same finger. FIG. 3B is a flow chart showing the prior art steps performed by a typical feature matching system 240 that is similar to the feature matching system proposed by Ratha, Karu, Chen, and Jain in the article incorporated above.

A minutiae in the input fingerprint and a minutiae in the template fingerprint are said to be corresponding if they represent the identical minutiae scanned from the same finger. An alignment estimation method based on the Generalized Hough Transform (as in the above cited Ratha et al. reference) estimates the parameters of the overall rotation, scaling and translation between the features of the input and template fingerprint (350). In step 360 the input fingerprint features are aligned with the template fingerprint using the rotation, translation, and scaling parameters estimated in step 350. In step 370, the aligned features of the input fingerprint features are matched with the features of the template fingerprint features. The matching consists of counting the number of features in the aligned input fingerprint representation for which there exists a corresponding consistent feature in the template fingerprint representation. The verification of a corresponding feature is performed as follows: for each feature in the aligned input fingerprint feature, the matcher determines whether there is a consistent template fingerprint feature in its rectangular neighborhood whose size is predetermined. Normalizer 380 takes the matching score generated by the matcher and computes a normalized matching score. The higher the normalized score, the higher the likelihood that the test and template fingerprints are the scans of the same finger.

STATEMENT OF PROBLEMS WITH THE PRIOR ART

Determining whether two representations of a finger extracted from its two impressions, scanned at times possibly separated by a long duration of time, are indeed representing the same finger, is an extremely difficult problem. This difficulty can be attributed to two primary reasons. First, if the test and template representations are indeed matched (also referred to as mated) pairs, the feature correspondence between the test and template minutiae in the two representations is not known. Secondly, the imaging system presents a number of peculiar and challenging situations some of which are unique to the fingerprint image capture scenario:

(i) Inconsistent contact: The act of sensing distorts the finger. Determined by the pressure and contact of the finger on the glass platen, the three-dimensional surface of the finger gets mapped onto the two-dimensional surface of the glass platen. Typically, this mapping function is uncontrolled and results in different inconsistently mapped fingerprint images across the impressions.

(ii) Non-uniform contact: The ridge structure of a finger would be completely captured if ridges of the part of the finger being imaged are in complete optical contact with the glass platen. However, the dryness of the skin, skin disease, sweat, dirt, humidity in the air all confound the situation resulting in a non-ideal contact situation: some parts of the ridges may not come in complete contact with the platen and regions representing some valleys may come in contact with the glass platen. This results in "noisy" low contrast images, leading to either spurious minutiae or missing minutiae.

(iii) Irreproducible contact: Manual labor, accidents etc. inflict injuries to the finger, thereby, changing the ridge structure of the finger either permanently or semipermanently. This may introduce additional spurious minutiae.

(iv) Feature extraction artifacts: The feature extraction algorithm is imperfect and introduces measurement errors. Various image processing operations might introduce inconsistent biases to perturb the location and orientation estimates of the reported minutiae from their grayscale counterparts.

(vi) The act of sensing itself adds noise to the image. For example, residues are leftover from the previous fingerprint capture. A typical imaging system distorts the image of the object being sensed due to imperfect imaging conditions. In the frustrated total internal reflection (FTIR) sensing scheme, for example, there is a geometric distortion because the image plane is not parallel to the glass platen.

In light of the operational environments mentioned above, the design of prior art matching algorithms 240 use models that have one or more of the following constraints or assumptions:

1. The finger may be placed at different locations on the glass platen resulting in a (global) translation of the minutiae from the test representation from those in the template representation.

2. The finger may be placed in different orientations on the glass platen resulting in a (global) rotation of the minutiae from the test representation from that of the template representation.

3. The finger may exert a different (average) downward normal pressure on the glass platen resulting in a (global) spatial scaling of the minutiae from the test representation from those in the template representation. For best matching results, two impressions of a fingerprint obtained by applying different downward normal pressure need to be scaled by an appropriate scaling factor.

4. The finger may exert a different (average) shear force on the glass platen resulting in a (global) shear transformation (characterized by a shear direction and magnitude) of the minutiae from the test representation from those in the template representation.

5. Spurious minutiae may be present in both the template as well as the test representations.

6. Genuine minutiae may be absent in the template or test representations.

7. Minutiae may be locally perturbed from their "true" location and the perturbation may be different for each individual minutiae. (Further, the magnitude of such perturbation is assumed to be small and within a fixed number of pixels.)

8. The individual perturbations among the corresponding minutiae could be relatively large (with respect to ridge spacings) but the perturbations among pairs of the minutiae may be spatially linear. The prior art does not effectively use this information.

9. The individual perturbations among the corresponding minutiae could be relatively large (with respect to ridge spacings) but the perturbations among pairs of the minutiae may be spatially non-linear. The prior art does not recognize or effectively handle this type of situation.

10. Only a (ridge) connectivity preserving transformation could characterize the relationship between the test and template representations.

Prior art matchers 240 relying on one or more of these assumptions have a wide spectrum of behavior. At the one end of the spectrum, the "Euclidean" matchers allow only rigid transformations (assumptions 1, 2, and 3) among the test and template representations. At the other extreme, "topological" matchers (e.g., Sparrow et al.) may allow the most general transformations including, say, order reversals. (Order reversal means that a set of minutiae in the test representation are in totally different spatial order with respect to their correspondences in the template representation).

The choice of assumptions often represents verification performance trade-offs. Only a highly constrained system (one that obtains exact and high quality fingerprints) or systems that do not have to give very accurate matches may use only a few of the assumptions above. For examples, a number of the matchers in the literature assume similarity transformation (assumptions 1, 2, and 3); they tolerate both spurious minutiae as well as missing genuine minutiae. Alternative prior art systems like "Elastic" matchers (e.g., Ratha et al) use assumptions 1, 2, 3, 5, 6, and 7) accommodate a small bounded local perturbation of minutiae from their true location but cannot handle large displacements of the minutiae from their true locations (assumptions 4 and 8).

FIG. 4 illustrates a typical situation of aligned ridge structures of two fingerprints 401 and 402 scanned from the same finger (also called as a mated pair). The ridges of the 401 print are shown in solid lines and those of 402 are shown as dashed lines. Note that the best alignment in one part (bottom left 410) of the image may result in a large amount of displacements between the corresponding minutiae in the other regions (top middle 420). Consequently, the corresponding minutiae in the two fingerprints in the region 410, e.g., 450 and 460, are relatively closer and the corresponding minutiae in the two fingerprints in the region 420, e.g., 430 and 440, are separated 435 farther apart. In addition, observe that the distortion is non-linear: given distortions (e.g., 435 and 455) at two arbitrary locations on the finger, it is not possible to predict the distortion, e.g. 436, at all the intervening points on the respective lines joining the two points. Also, note that typically the spatial relationship of the two minutiae (e.g., 440 is top right of 450 in the fingerprint 401; and 430 is top right of 460 in the print 402) in each finger has remained the same despite the large distortion. In our opinion, a good matcher needs to accommodate not only global similarity transformations (assumptions 1, 2, and 3), but also shear transformation (assumption 4), linear (assumption 8) and non-linear (assumption 9) differential distortions. In our experience, assumption 10 is too general a model to characterize the impressions of a finger and its inclusion into the matcher design may compromise efficiency and discriminatory power of the matcher. In addition, the matchers based on such assumptions need to use connectivity information which is notoriously difficult to extract from the fingerprint images of poor quality.

OBJECTS OF THE INVENTION

An object of this invention is an improved image processing system.

An object of this invention is a system and method for matching images using an aligned string-based representation.

An object of this invention is a system and method for matching fingerprint images using an aligned string-based representation.

SUMMARY OF THE INVENTION

The invention is a system and method for matching a two-dimensional pattern of lines, e.g., a fingerprint, by creating a one-dimensional representation of one or more points (e.g., minutiae) on the lines in the patterns to be matched. The one dimensional representations are created by finding a corresponding reference point (minutiae) in each of the patterns and creating an index of other points in each of the respective patterns with respect to the reference point (minutiae). The indexes are adaptively compared, taking into account the elastic distortions of the lines. (Note that pattern and fingerprint, line and fingerprint ridges, and points and minutiae will be used interchangably without loss of generality.)

BRIEF DESCRIPTION OF THE DRAWINGS

The foregoing and other objects, aspects and advantages will be better understood from the following detailed description of preferred embodiments of the invention with reference to the drawings that include the following:

FIG. 8A is a drawing illustrating the selection of candidate points (minutiae) from input and template fingerprint for determining reference minutiae.

FIG. 12 is a drawing illustrating the polar attribute computation of FIG. 10 for several minutiae.

DETAILED DESCRIPTION OF THE INVENTION

Disclosed is an alignment-based elastic matching process that is capable of finding the correspondences between the candidate points (minutiae) in each of an input and template image (fingerprint). The process begins with identifying at least one point in each of the input and template images that correspond, i.e., are the same point. These are designated as reference points. Using the reference points and the line segments containing the reference points, the process also is able to find the alignment of the input and template image. Further, using the reference points, an index is created for one or more of the other points (candidate points) in the each image with respect to the reference point in the given image. The matching process matches candidate points on the input and template images by comparing the indices associated with the candidate points to establish a correspondence between pairs of candidate points. The matching process incrementally and adaptively establishes a correspondence between candidate points by basing this correspondence on the indices associated with the candidate points and the correspondences of the pairs of candidate points previously established.

Figure 18A:
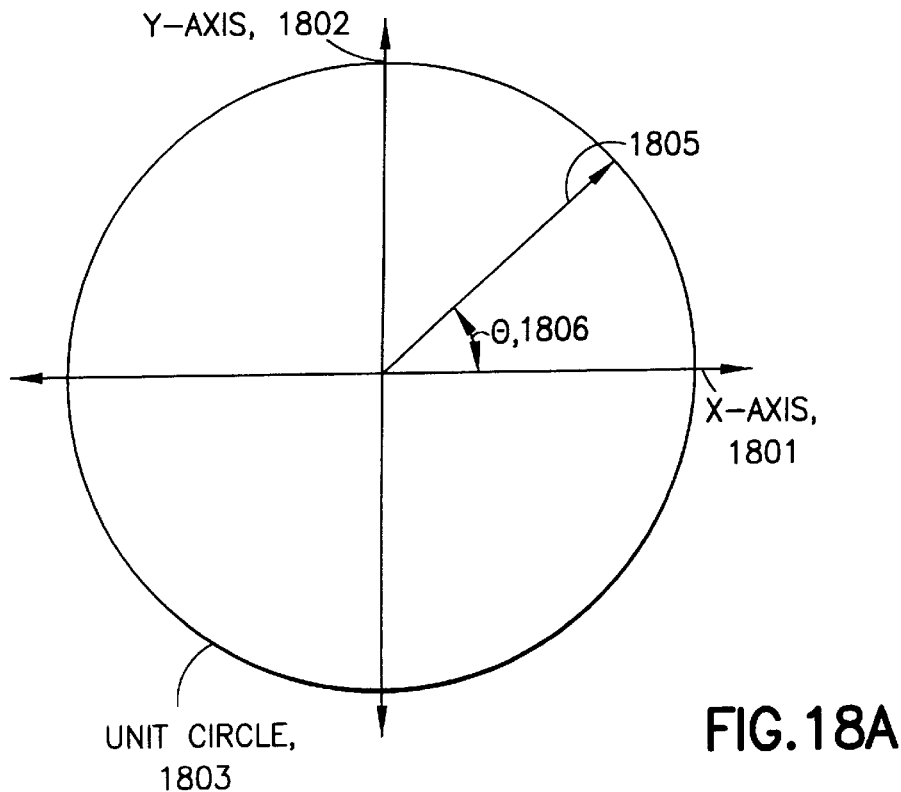
FIGS. 18A and 18B together illustrate the definition of a half angle.
Figure 18B:
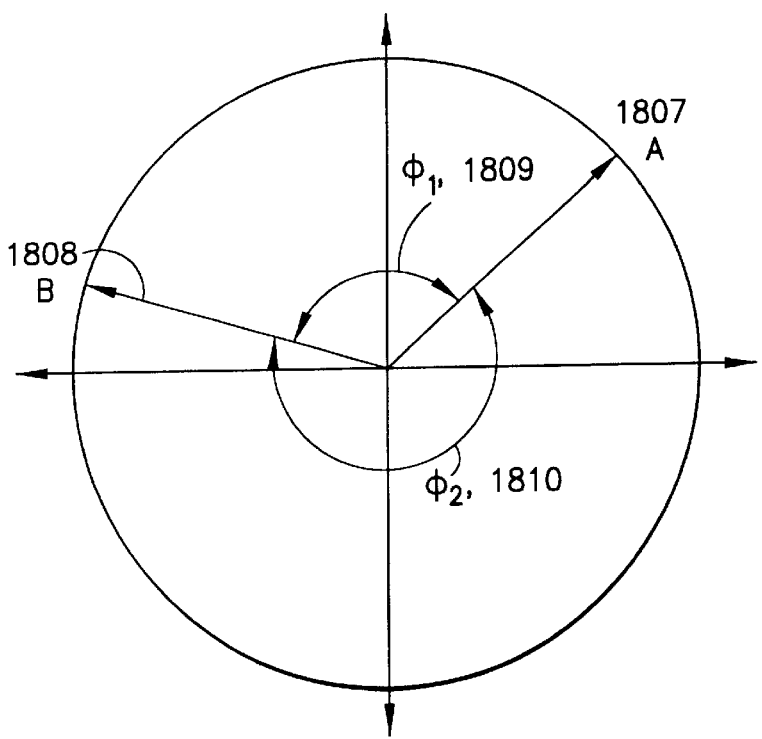

Before further explanation of the invention, let us define the concept of half angle using FIGS. 18A and 18B. An angle θ 1806 could be represented as unit vector 1805 as shown in FIG. 18A: the length of such vector is one and the direction of the vector is determined by the magnitude of the rotation θ from the x-axis 1801 in counter-clockwise direction. Such a vector representation of the angle will be referred to as angle vector. Now referring to FIG. 18B, half angle between two angle vectors A 1807 and B 1808 is defined as the smallest of angles $\phi_1$ 1809 and $\phi_2$ 1810 (in degrees) through which one angle vector needs to be rotated (either clockwise or counter-clockwise) to make it congruent (e.g., parallel) to the other angle vector. In this illustration, $\phi_1$ is the half angle between A 1807 and B 1808. Half-angle is always less than or equal to 180 degrees.

Figure 5:
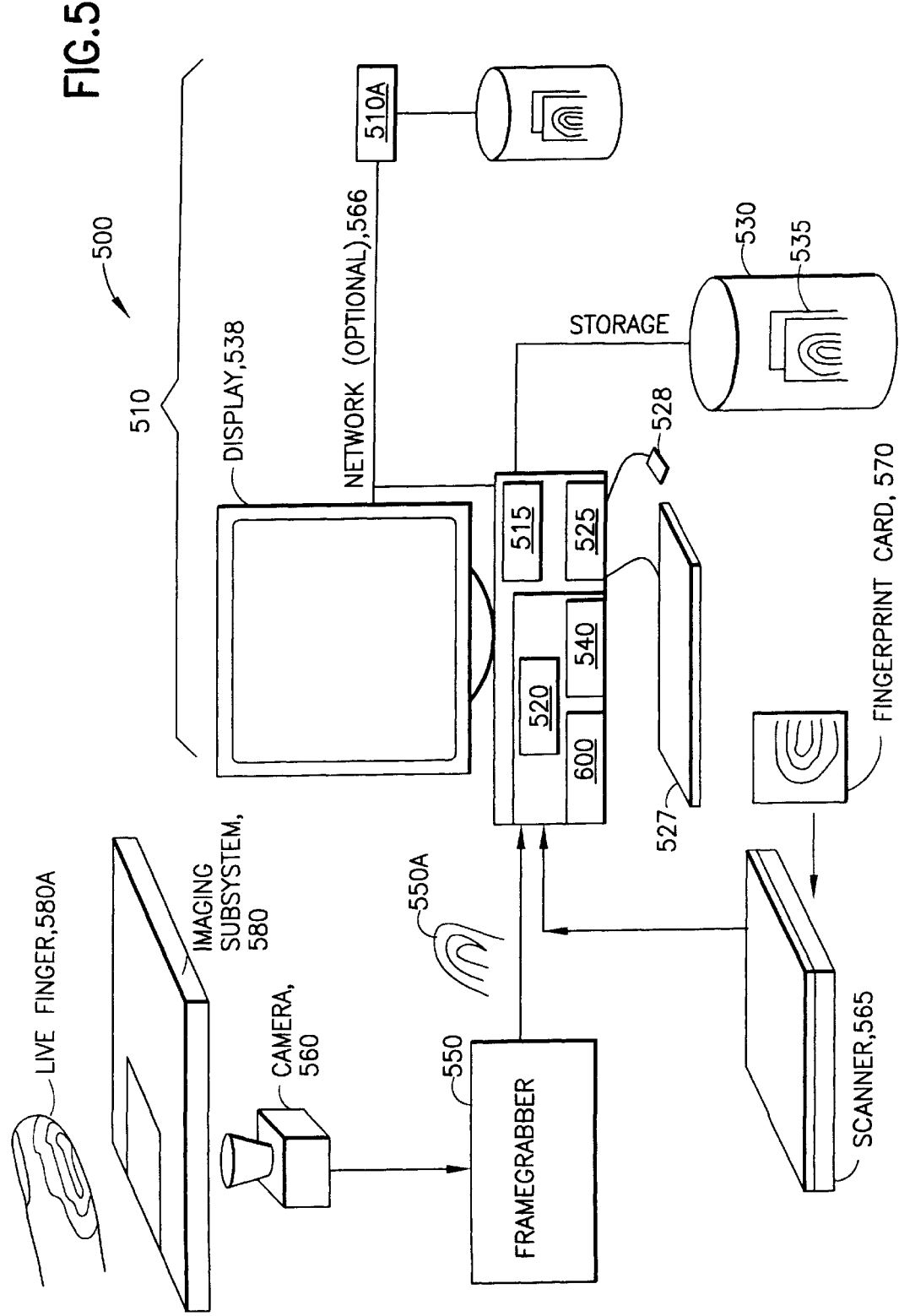
FIG. 5 is a block diagram of one preferred embodiment of the present fingerprint matching system.

Referring now to the drawings, and more particularly to FIG. 5, there is shown the block diagram representation of a general computer hardware environment that is used as the image processing system 500. This computer 510 may be one of International Business Machines Corporation (IBM) Personal System/2 (PS/2) family of Personal Computers, a RISC System/6000, or Power Parallel System (SP/x), or equivalent. The system 500 includes one or more central processing units (CPU) 515, which may conform to any general computer architecture (e.g., Intel or a reduced instruction set microprocessor.) The CPU 515 is attached to a system bus (not shown) to which are attached a read/write and/or random access memory (RAM) 520 that can include one or more cache memories, a read-only memory (ROM) 540, and an input/output adapter 525. The RAM 520 provides temporary storage for one or more application program processes (e.g., 600) containing code and/or data while the ROM typically includes the basic input/output system (BIOS) code. A disk memory 530, e.g., Direct Access Storage Devices (DASDs), here represented by a hard disk drive 530, are also connected to the CPU by an appropriate adapter (not shown.) The hard disk drive 530 typically stores the computer's operating system (OS), such as IBM's OS/2 operating system, and various application programs, data, and/or databases. These databases include intermediate results and fingerprint image data 535. Typically, the input/output adapter 525 has attached to it a keyboard 527, a mouse 528, and/or other user interface devices (not shown).

The system 500 also can include a display 538, here represented as a cathode ray tube (CRT) display but which may be a liquid crystal display (LCD) or other suitable display and/or graphic user interface (GUI). The display 538 is connected to the system bus via a display adapter.

The computer 510 is also interfaced with a framegrabber 550 and an image acquisition device, e.g., a camera 560 along with imaging subsystem to capture a livescan fingerprint image onto the computer memory/disk. Alternatively, the computer might be communicating with a document scanning device 565 that scans the fingerprint image from a document like an inked fingerprint card 570. Any other known means can be used to enter a fingerprint image into the memory 535, e.g., transmitting an image over a network 566 from other equivalent systems 510A.

The hardware for system 500 and equivalents of these systems are well known to those skilled in the art.

Personal System/2, PS/2, OS/2, RISC System/6000, Power Parallel System, SP/x, and IBM are trademarks of the International Business Machines Corporation.

Figure 1A:
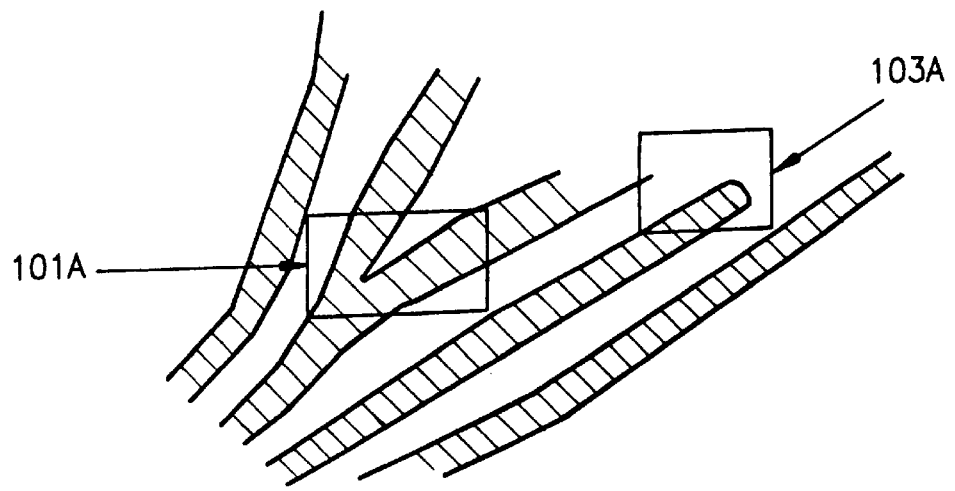
FIG. 1A is a prior art drawing of a portion of a typical fingerprint.
Figure 1B:
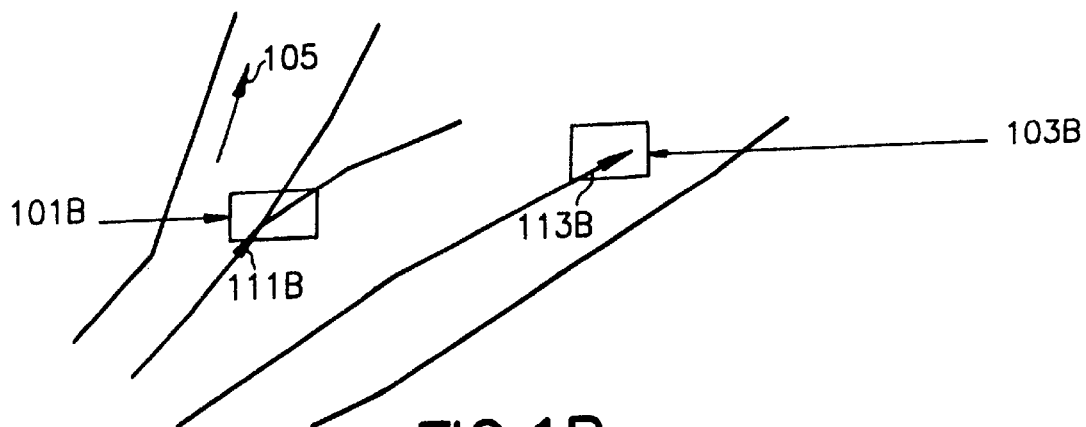
FIG. 1B is a prior art drawing showing minutiae of the finger print portion in FIG. 1A.
Figure 2:
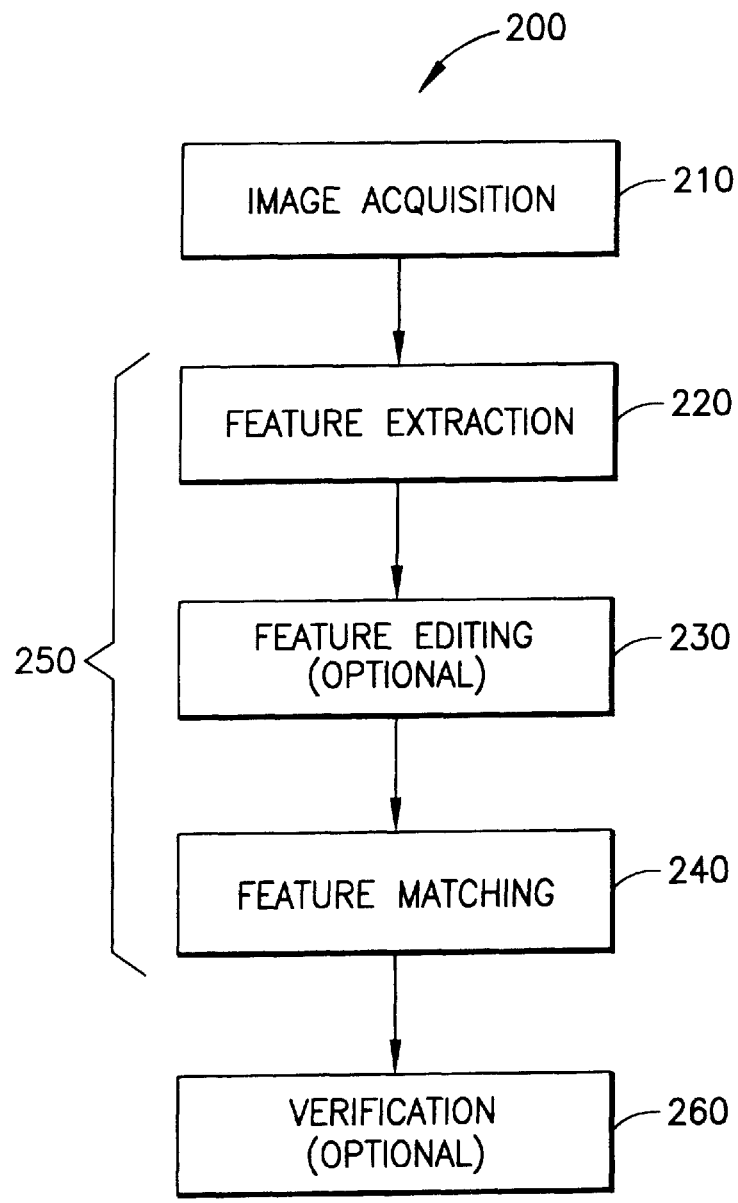
FIG. 2 is a block diagram of one preferred embodiment of the present system (a typical fingerprint matching system).
Figure 3A:
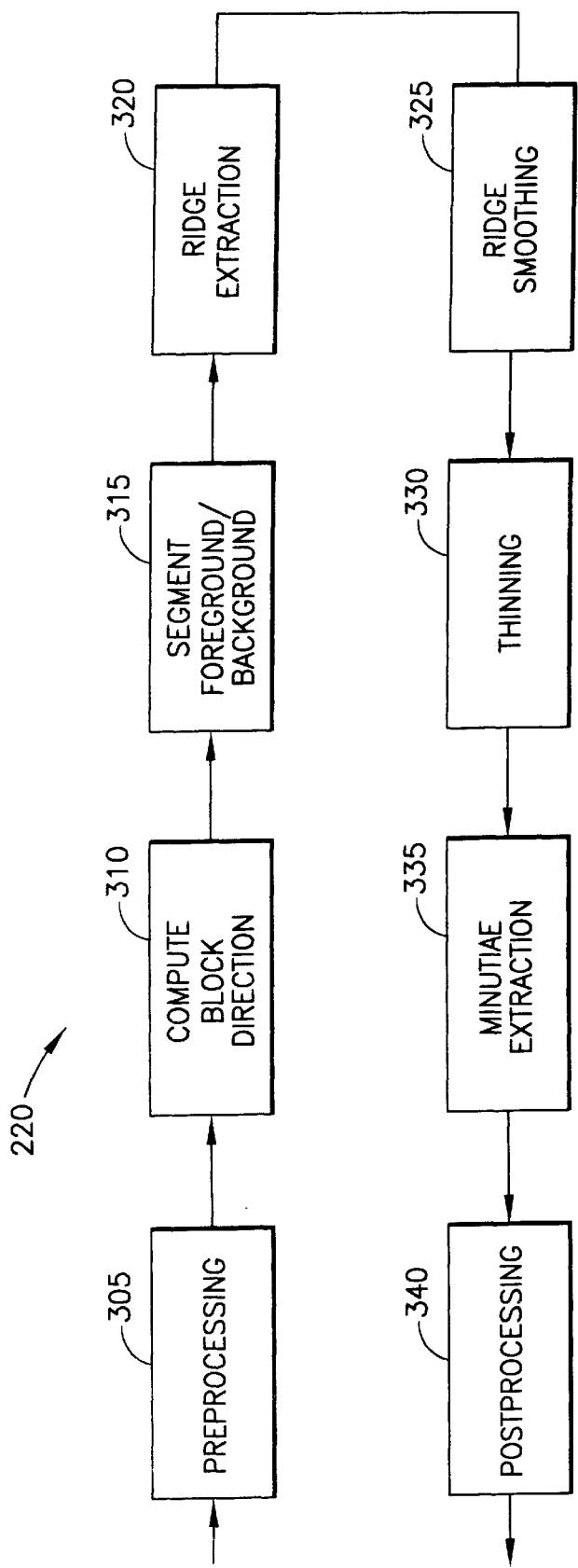
FIG. 3A is a flow chart showing the prior art steps performed by a typical feature extraction process.
Figure 3B:
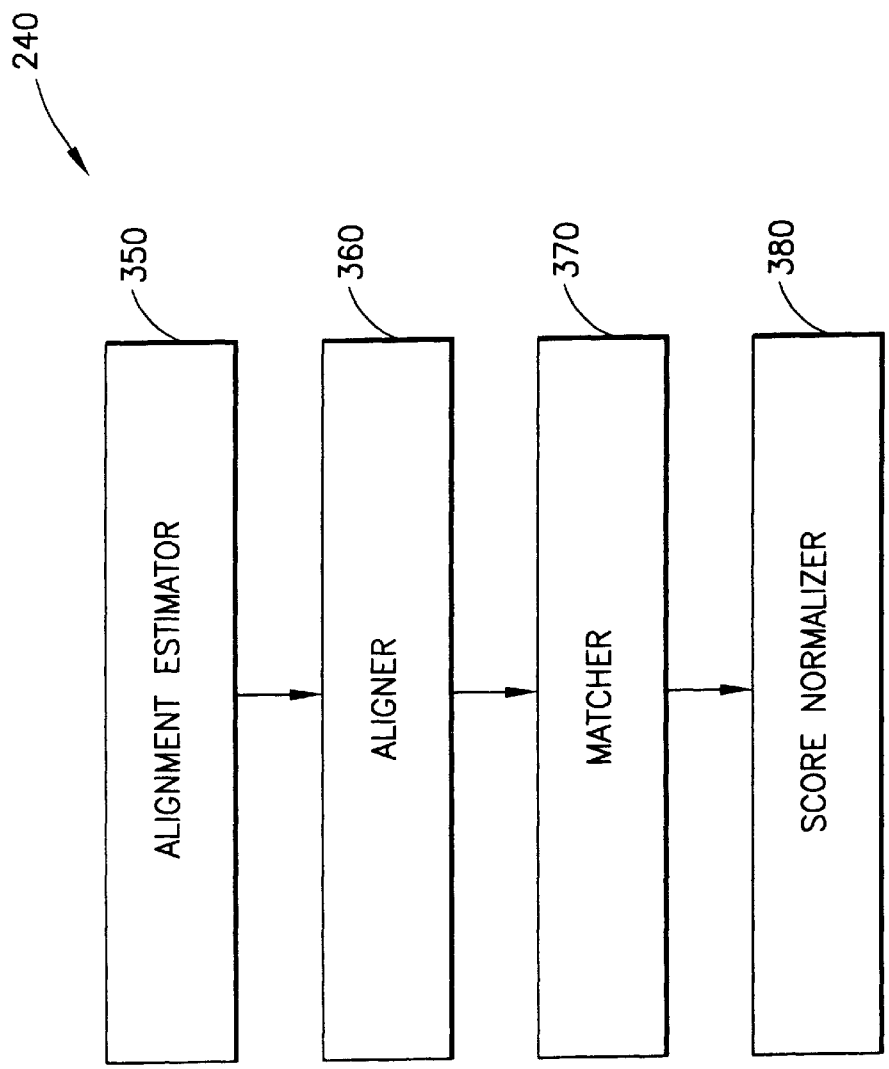
FIG. 3B is a flow chart showing the prior art steps performed by a typical feature matching system.
Figure 6:
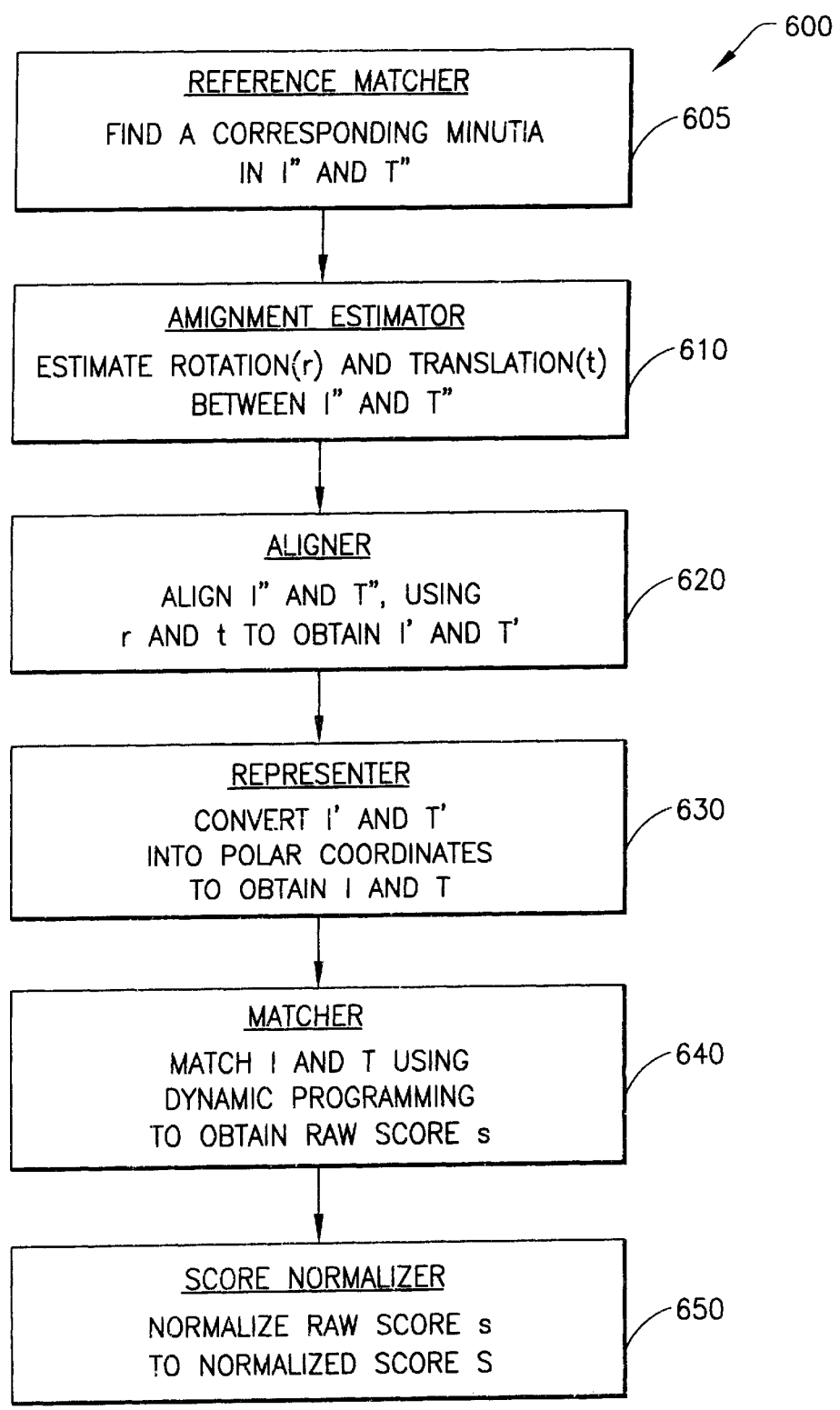
FIG. 6 is a flow chart of the present matching process.

FIG. 6 is a flow chart showing the steps performed by a preferred automatic fingerprint identification system 600. Steps 620 and 650 correspond to prior art steps 350 and 380 of FIG. 3B respectively. The reference matcher 605, alignment estimator 610, representer 630, and the matcher 640 steps include novel functions that are described below in detail. 630 is the invention claimed in this disclosure.

The matcher 640 is the invention claimed in this disclosure.

In this disclosure, all pixel measures presuppose the fingerprint image resolution of 512 dots per inch. The measures need to be appropriately scaled if the resolution of the given fingerprint is not 512 dots per inch (dpi). The techniques of scaling are known to those skilled in the art.

The feature matching process 600 consists of six components: a Reference Matcher 605, an Alignment estimator 610, an Aligner 620, a Representer 630, a Matcher 640, and a Score Normalizer 650. The Reference matcher 605 is used to identify one single identical minutiae in the input and template representation, i.e., the reference points/minutiae. The Alignment estimator 610 estimates the translation (t= $(\Delta_x,\Delta_y)$) and rotation ($\Delta\theta$) parameters between the ridge associated with each input minutiae I" and the ridge associated with each template minutiae T". The Aligner 620 aligns the input and template minutiae (I" and T") patterns according to the estimated parameters to obtain their transformed representation I' and T', respectively. The Representer 630 converts the transformed template T' pattern and transformed input pattern I' into the polar coordinate representations with respect to the reference points/minutiae; and then subsequently represents them as two symbolic string representations, P and Q of the input and template fingerprints.

The Matcher 640 matches the resulting strings P and Q with a modified dynamic-programming algorithm described below to find the matching score indicating the number of matched corresponding minutiae between the input and template fingerprints. The Normalizer 650 uses the minimum edit distance between P and Q to establish the correspondence of the minutiae between P and Q. The normalized matching score, S, is then defined as:

$$S = 100M' \times \frac{M'}{(M \times N)},$$

where M' is the matching score generated by the matcher 640; M and N are the number of minutia extracted from the template and input fingerprints.

The assumption underlying the matching system 600 is that if the input fingerprint representation, (e.g. 550A, 570) and the template fingerprint representation 535 are originating from the same finger, then the input and template fingerprint representations can be coarsely aligned using the rotation and translation parameters estimated by the alignment estimation process 610. The input and template fingerprint representation thus aligned (401 and 402 in FIG. 4) when transformed by the representer 630 and then matched by the matcher 640 result in a high normalized score irrespective of the remaining (linear and non-linear) distortions in the input or template fingerprints.

Suppose that the input minutiae and template minutiae are originating from the two fingerprints (input and template) acquired from the same finger, possibly scanned at different times. The objective of the alignment estimation process 610 is to determine the values of the overall rotation and translation parameters between the representations of the input 550A/570 and template representations 535. In a preferred embodiment, the alignment estimation process 610 makes such a determination based on ridge information associated with the input and template minutiae set. Based on the ridge information associated with the corresponding pair of minutiae, values of the overall rotation and translation parameters between the input and template fingerprint representation are estimated, i.e., the input and template fingerprint differ by 15 degrees/radians of clockwise rotation and 3 up and 5 left pixels of translation. Suppose the input minutiae and template minutiae originate from different fingers, the alignment estimation process determines the values of the overall rotation and translation that will align the reference input ridge in the input representation to the reference ridge in the template representation. (As defined below, points from the input and template representations (a point pair) are corresponding if they represent the same point on a finger and one of these pairs of corresponding points are selected by the reference matcher 605 as reference points. The ridges on which these points lie are called reference ridges.)

Figure 7:
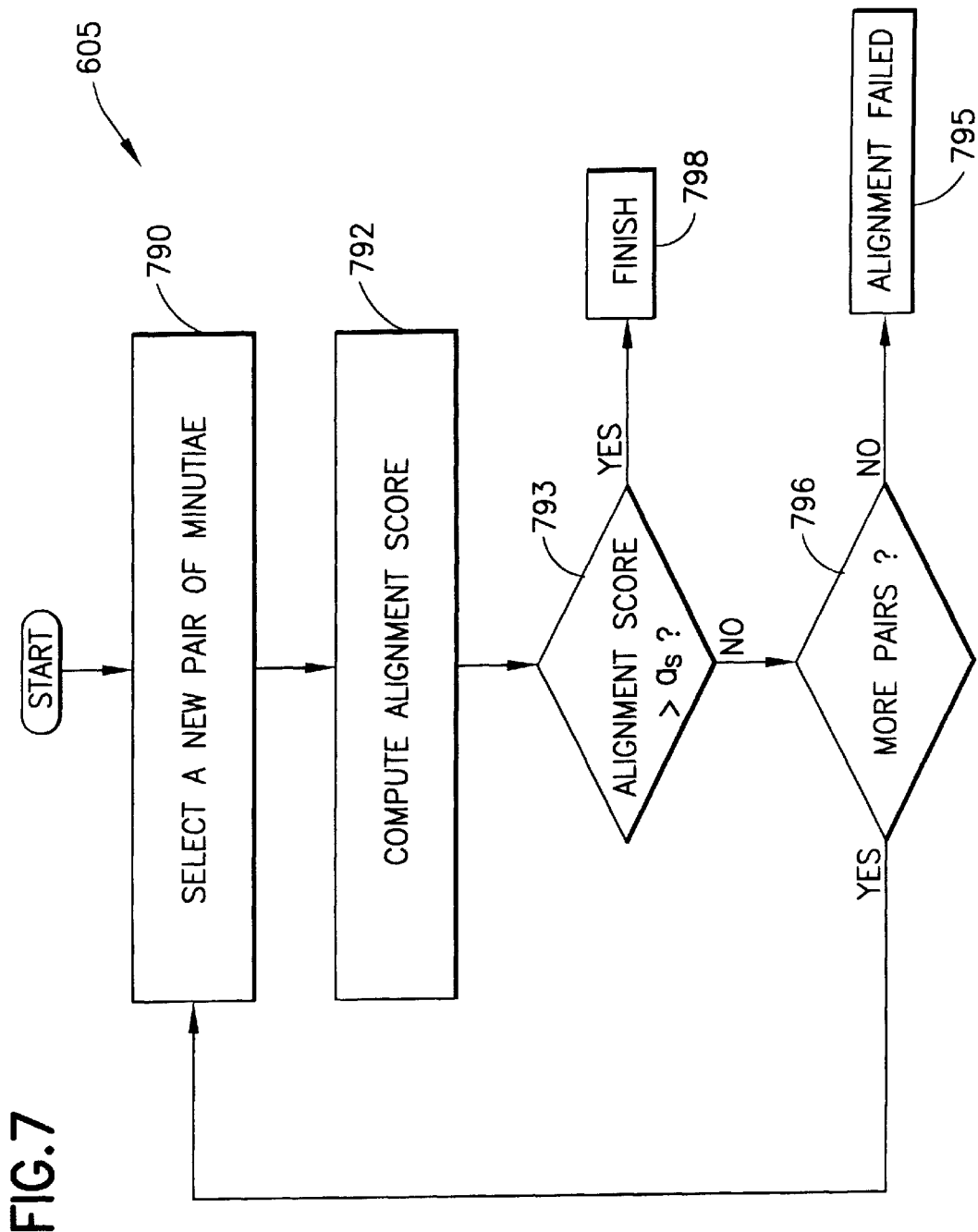
FIG. 7 is a flowchart showing the steps performed by the reference matcher in FIG. 6.

The Reference matcher process 605 finds one minutia from input fingerprint and one minutia from the template fingerprint that correspond to one another, i.e., are the same minutia on the finger in each representation. The Reference matcher process 605 is described in FIG. 7 as a flowchart. The Reference matcher process 605 selects a pair of minutiae, one minutia d 803 of the pair is any given minutia taken from the input minutiae set of the input representation (550A, 570, 801) and one minutiae D 804 is any given minutia taken from the template minutiae set of the template representation (535, 802) (shown in FIG. 8A). The method of selection (790) of such pair can be arbitrary or systematic. In a preferred embodiment of our system, the selection is made systematically based in the increasing order of the distance of the minutiae from the center of mass ($x_c y_c$) of the fingerprint minutia computed as follows:

$$x_c = \frac{1}{M} \times \sum_{i=1}^{M} x_i$$

$$y_c = \frac{1}{M} \times \sum_{i=1}^{M} y_i$$

where M is the number of minutia detected in the fingerprint and ($x_i$, $y_i$) are the coordinates of the minutiae. Thus the first pair of minutiae selected are the minutia that is closest to the center of mass of minutiae in each of the input 801 and template 802 representations. An alignment score is determined in step 792, see FIGS. 8B and 8C. In step 793, the process 605 ends if the alignment score is greater than a threshold $a_s$, if not, the process 605 looks for more pairs, step 796. If there is a pair of minutiae that has not been processed, a next pair is selected (e.g., the next closest pair to the respective centers of mass) upon returning to step 790. If there are no more pair of minutiae (795) and there is no pair with an alignment score greater than the threshold, the reference matcher process 605 is said to have failed. In such circumstances, the whole matching process fails and could execute a number of options available to the system, e.g., recapture of the input fingerprint, examination of the match by another matching subsystem, or examination of the match by a human fingerprint examiner.

If the selection of new pair of minutia succeeds, the process 605 finishes (step 798) and the hypothesis that the selected pair of minutiae are indeed corresponding minutiae (i.e., originating from identical minutiae on the same finger) is considered true.

Again, the verification is based on an alignment score obtained by matching the ridge information associated with the minutiae pair (792). If the alignment score is greater than an alignment threshold score ($a_s$), the hypothesis is considered to be verified; the pair of points (i.e., on which the respective reference points lie) will be referred to as the reference points and the ridge associated with the reference points will be referred to as reference ridges. These reference points/ridges are used for the alignment estimation computation 610. As stated before, in step 793, if the alignment score is less than $a_s$, the process proceeds to selection of another new pair of minutia from the template and input fingerprint representations. In one embodiment of our system, the preferred alignment threshold score $a_s$, was between 0.5 to 1.0 and more preferably $a_s$ was set to 0.8.

An alternative method for reference matching 605 that is computationally expensive but provides an alignment score for every possible pair of minutiae is as follows: determine the alignment score for every possible pair containing one input minutia and one template minutia and select the pair with the best alignment score as the reference pair. An advantage of this alternative method is that it does not require selection of the alignment threshold score parameter, e.g., 0.8. Note that, using this computationally expensive approach, no further matching is required because a metric of correspondence has been determined for every possible pair of minutia.

In some embodiments of the system, not all minutiae participate in the reference matcher process 605. The criteria for the participation could depend upon the minutia attribute (e.g., a bifurcation or ridge ending minutiae), the alignment process state (e.g., how many proposed minutiae correspondences failed to match), or the application/system context (e.g., if the application permits capture of new input fingerprint, in case all the proposed pairs of minutiae fail to be verified for correspondence. In a preferred embodiment of our system, we allowed only ridge ending minutiae to participate in the reference matcher process 605.

Figures 8B, 8C:
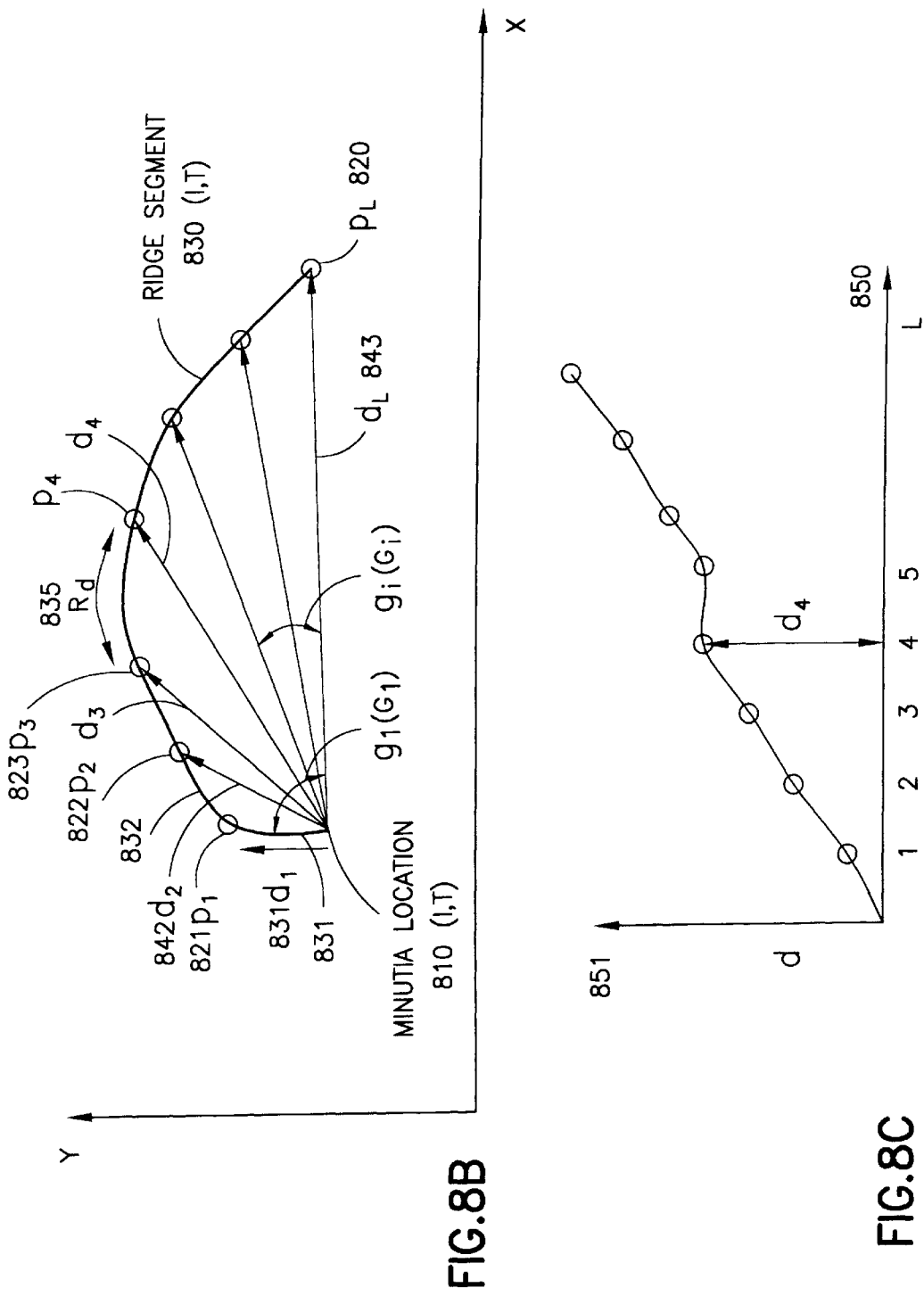
FIG. 8B is a drawing illustrating the novel subsegmenting of a line image, e.g. a fingerprint ridge segment.
FIG. 8C is a drawing illustrating a one dimensional representation of the subsegmenting in FIG. 8B.

We now describe details of the process of computing alignment score (step 792). Refer to FIG. 8B. In a preferred embodiment, the alignment score is determined using the selected input minutia (810I) of the pair and the (input) ridge on which it lies and also the selected template minutia (810T) of the pair and the (template) ridge on which it lies, respectively. More specifically, a segment 830I (input ridge segment) of the reference input ridge is chosen and divided into L subsegments of equal length, each of length $R_d$ 835. Also a segment 830T (template ridge segment) of the reference template ridge is chosen and divided into L subsegments of equal length, each of length $R_d$ 835. A ridge point, ($p_i$), e.g., 821 p1, is defined at the end (or beginning or other location, e.g. mid-point) of each subsegment, e.g., 832. Information associated with each minutia of the pair includes a minutia location 810 and the locations of the L respective ridge points (typically 821–823).

In a more preferred embodiment of the system, we have selected $R_d$ 835 to correspond to the average ridge separation; more specifically, $R_d$ was set in the range of 10 to 15 pixels and more preferably it was set to 12 pixels; L was set in the range of 5 to 20 and more preferably to 10.

Given a minutia location 810 and associated ridge segment 830 spanning from beginning location 810 to ending location 820, alignment score computation is performed as follows: First, a one-dimensional vector is derived from minutia location 810 and ridge points (typically 821–823). Considering the minutia location 810 associated with the ridge segment 830 as origin, ridge subsegments 831, 832 etc. each of size L are demarcated at the ridge points (typically 821–823) along the ridge segment as described above. This process of dividing ridge segment 830 into L subsegments generates L ridge points $p_1$ (821), $p_2$ (822), ..., $P_L$ (820). The Euclidean distances from the origin 810 to ridge points $d_1$ 841, $d_2$ 842, ..., $d_L$ 843 of the respective ridge points $p_1$ 821, $p_2$ 822, ..., $p_L$ 820 associated with that minutia are computed. The ordered sequence of the L successive pixel distances ($d_1$ 841, $d_2$ 842, $d_3$, ..., $d_L$843) constitutes a one-dimensional discrete representation of the ridge segment 830. Given this one-dimensional representations ($d_1$, $d_2$, ..., $d_L$) for the input ridge segment 830I and ($D_1$, $D_2$, ..., $D_L$) for the template ridge segment 830T, respectively, the alignment score A is computed. In the preferred embodiment, the alignment score A is computed as follows:

$$A^2 = \frac{\sum_{i=1}^{L} d_i \times D_i}{\sqrt{\sum_{i=1}^{L} d_i^2 \times D_i^2}}$$

In some alternative embodiments of the alignment score computation, instead of dividing the ridge segment into subsegments of equal size, the ridge segment is sampled into segments of unequal size (non-uniform sampling). The computation of the alignment score may remain the same. Such non-uniform sampling may result in a more reliable alignment score. In some embodiments of system, more complex attributes of the ridge segment pixels may participate in the alignment score computation (e.g., local curvatures of the ridge segment pixels) or a more complex computation may be used for determining alignment parameters accurately (e.g., optimal rigid transformation between the polynomial representations of the input and template ridge segments). For computing alignment score, other methods of comparing piecewise linear/curvilinear segments can be used. These alternative methods are within the contemplation of the inventors.

Figure 9:
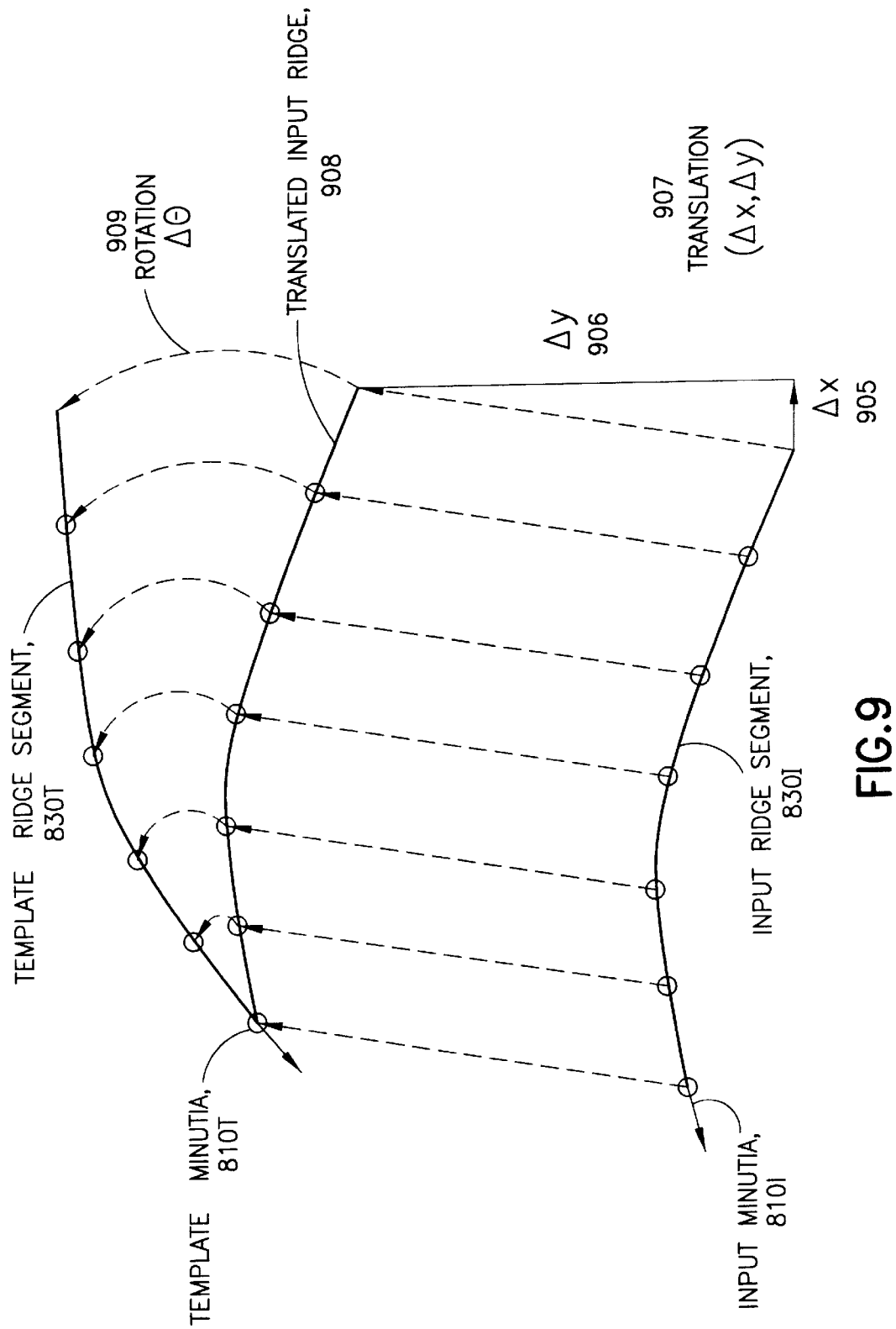
FIG. 9 is a drawing illustrating an alignment estimation between two line images, e.g fingerprint ridges.

Refer to Alignment Estimator process 610 (FIG. 6) and FIG. 9. Given a reference minutia and associated ridge segment, alignment estimation computation 610 can compute the values of the rotation and translation parameters between the input and template fingerprint representation, i.e., the degree of alignment/misalignment between them (see FIG. 9). Given a pair of reference minutia (one template minutia 810T and one input minutia 810I) and associated reference ridge segments, (830T and 830I) the alignment estimation 610 could use any combination of the following different components of the ridge segment information: (i) the ordered list of distances of each of the successive pixels on the reference ridge segment; (ii) the ordered list of orientations of the tangents at each successive pixel on the ridge segment; (iii) the ordered list of the magnitude of the curvature at each successive pixel on the ridge segment; and (iv) the ordered list of the sign of the curvature at each successive pixel on the ridge segment. These components of the information could be combined differently to design a reference minutiae matcher. These alternative combinations are within the contemplation of the inventors.

In a preferred embodiment, the reference minutia matcher uses the distance information only and is described in detail below (see FIG. 9). The translation vector 907 (with x-component $\Delta x$ 905, and y-component $\Delta y$ 906) between the two corresponding ridges is computed as $$(\Delta x, \Delta y) = (x_{rI}, y_{rI}) - (x_{RT}, y_{RT})$$

where $(x_{rI}, y_{rI})$ and $(x_{RT}, y_{RT})$ are the x and y coordinates of the input and template reference minutiae locations, 810I and 810T, respectively. The rotation angle $\Delta\theta$ 909 between the two ridge segments is 830I and 830T computed as $$\Delta\theta = \left(\frac{1}{L}\right) \times \sum_{i=0}^{L} (g_i - G_i),$$

$g_i$ ($G_i$) is the angle between the vector $d_i$ ($D_i$) and the x-axis for $i^{th}$ ridge point $p_i$ on the input (template) ridge. See FIG. 8B, e.g., 841, 842. In a preferred embodiment, the scaling factor between the input and template images is assumed to be between 0.5 to 1.5, preferably 1.

Given the alignment parameters, e.g. translation ($\Delta x$, $\Delta y$) and rotation $\Delta\theta$, estimated by the alignment estimation process 610, the alignment process 620 involves rigid transformation of the fingerprint representations so that input and template fingerprints have same frame of reference, e.g., the minutia location 810 for the input 810I and template 810T reference minutiae coincide (as much as possible) and one and/or another of the fingerprint representations is rotated so that the ridge segments 830I and 830T coincide. The system has the choice of (i) transforming both the input and template fingerprints representations into frames of reference of common representation, (ii) transforming the input fingerprint representation into the frame of reference of template fingerprint representation; or (iii) transforming the template fingerprint representation into the input fingerprint representation frame of reference. In the preferred embodiment of our system, we transform the input fingerprint representation into the frame of reference of the template fingerprint.

All of the minutiae of the input and/or template fingerprint image are translated and rotated by the translation ($\Delta x$, $\Delta y$) and rotation $\Delta\theta$, determined to make the reference minutiae coincide (as much as possible). For example, denote any of the minutiae in a fingerprint representation as $(x_i, y_i, \phi_i)$. Note that these are the transformation parameters estimated in the alignment estimation 610. With these transformation parameters, all the N minutiae of the input fingerprint representation are translated and rotated according to the following formula:

$$(x_i^a, y_i^a, \phi_i^a)^T = (\Delta x, \Delta y, \Delta\phi)^T + J \times (x_i - x_{rI}, y_i - y_{rI}, \phi_i)^T$$

where $V^T$ operator indicates transpose operation of vector/matrix V and J is a 3X3 rotation matrix given by $$\begin{vmatrix} \cos\Delta\theta & \sin\Delta\theta & 0 \\ \sin\Delta\theta & -\cos\Delta\theta & 0 \\ 0 & 0 & 1 \end{vmatrix}$$

where $(x_i, y_i, \phi_i)$, for $i=1, 2, \ldots, N$, represents an input minutiae and $(x_i^a, y_i^a, \phi_i^a)$ represents the corresponding aligned (i.e. transformed) minutiae. Once the fingerprint representations have been aligned, the representations would be referred to as aligned representations. For the sake of brevity, the superscript a will be dropped in the rest of this disclosure and all minutia $(x, y, \phi)$ attributes referred will be aligned (transformed) representations unless explicitly mentioned otherwise.

The representer process 630 converts both the (aligned) input and template Cartesian fingerprint representations into polar coordinate representations 1010 as follows (see FIG. 10).

After aligning the input and template fingerprint representations a list of all the minutiae in each respective representation is made. For example, the M minutiae in the input fingerprint representation is defined and represented as a first string of first tuples $(m_{1I} \equiv (x_{1I}, y_{1I}, \phi_{1I}), m_{2I} \equiv (x_{2I}, y_{2I}, \phi_{2I}), \ldots, m_{MI} \equiv (x_{MI}, y_{MI}, \phi_{MI}))$ of M minutiae (each described by its x-coordinate, y-coordinate, and orientation). The N minutiae in the template fingerprint representation is defined and represented as a second string of second tuples $(m_{1T} \equiv (x_{1T}, y_{1T}, \phi_{1T}), m_{2T} \equiv (x_{2T}, y_{2T}, \phi_{2T}), \ldots, m_{NT} \equiv (x_{NT}, y_{NT}, \phi_{NT}))$ of N minutiae (each described by its x-coordinate, y-coordinate, and orientation). Each of the respective reference minutiae is identified by $m_{rI} \equiv (x_{rI}, y_{rI}, \phi_{rI})$ 810I and $m_{RT} \equiv (x_{rT}, y_{rT}, \phi_{rT})$ 810T. For brevity, we will refer to a input/template reference minutia as $m_r \equiv (x_r, y_r, \phi_r)$ where context can disambiguate between input and template reference minutiae.

Figure 10:
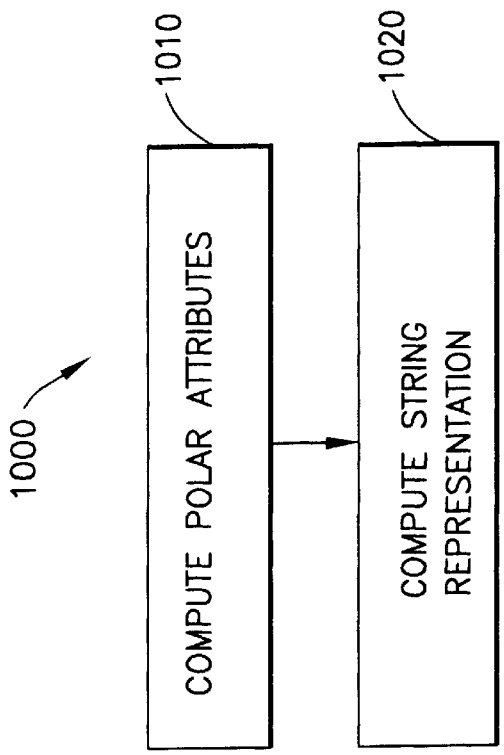
FIG. 10 is a flowchart showing the steps performed by the representer in FIG. 6.

FIG. 10 is a flow chart that shows a process 1000 to derive a one-dimensional string representation of each of the input and template fingerprints. The process 1000 has two steps: (i) computing polar attributes for each minutia 1010; and (ii) composing string representation 1020.

Figure 11:
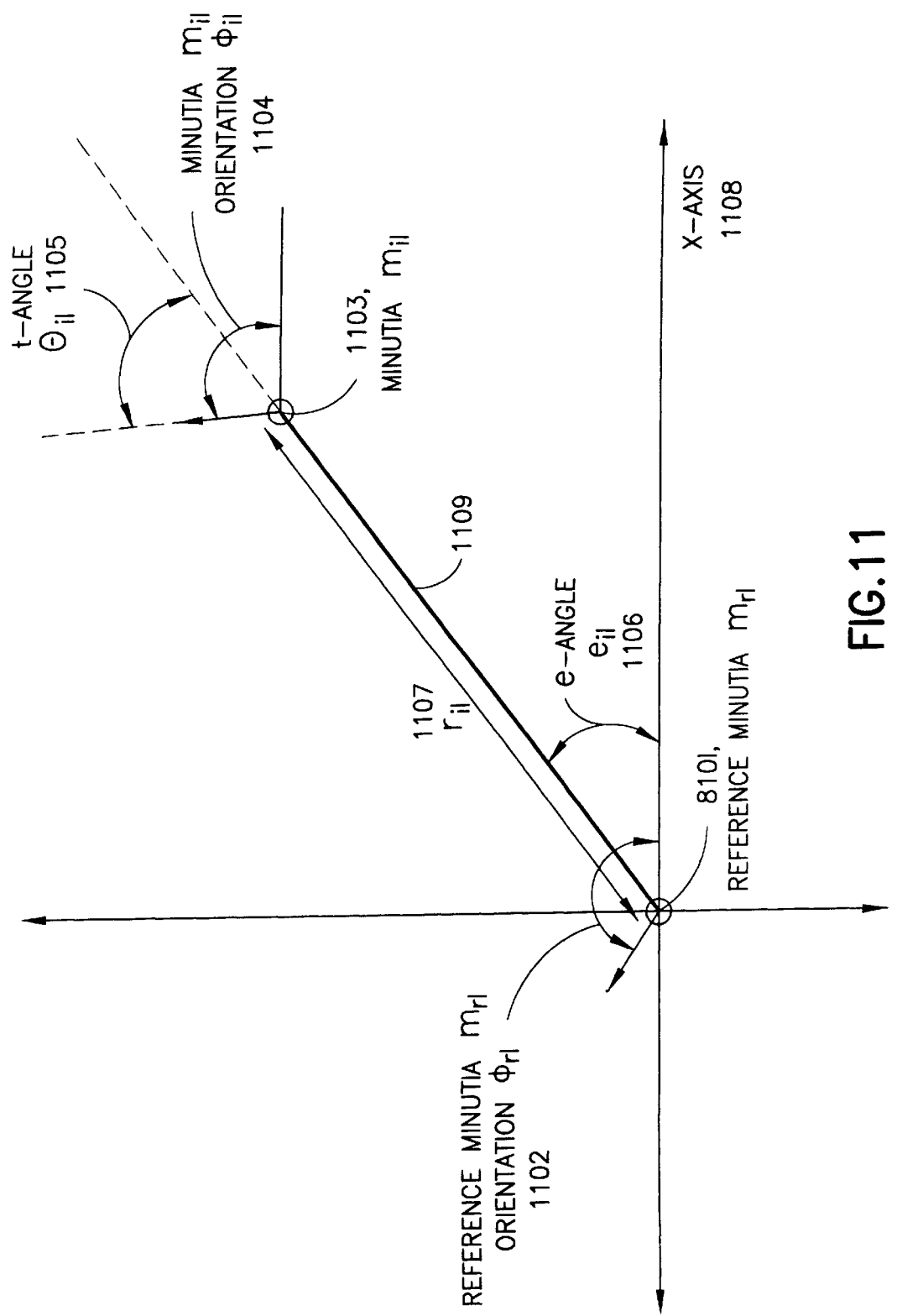
FIG. 11 is a drawing illustrating the polar attribute computation of FIG. 10.

We now describe the computation 1010 of polar attributes (see FIG. 11) for input minutiae. (Template minutiae are done the same way.) There are three polar attributes associated with each minutia: radius, e-angle, and t-angle. For each minutiae $m_i$, the radius $r_i$ 1107 is the Euclidean distance between given minutiae and the respective reference minutia 45 (810I,T). It is computed as the distance (in pixels) $r_i$:

$$r_i = \sqrt{(x_i - x_r) \times (x_i - x_r) + (y_i - y_r) \times (y_i - y_r)}$$

For instance, for an input minutia $m_{iI}$, the radius $r_{iI}$ 1107 is the Euclidean distance between given minutiae and the input reference minutia 810I. It is computed as the distance (in pixels) $r_{iI}$:

$$r_{iI} = \sqrt{(x_{iI} - x_{rI}) \times (x_{iI} - x_{rI}) + (y_{iI} - y_{rI}) \times (y_{iI} - y_{rI})}$$

The e-angle $e_i$ 1106 for the given minutia $m_i$ 1103 is the counter-clockwise angle subtended by the line segment 1109 joining $m_i$ 1103 and the respective reference minutia (810I, T) $m_r$ 1102 with a fixed reference axis 1108 passing through the reference minutiae (810I, T) 1102.

The t-angle $\theta_i$ 1105 for the minutia $m_i$ 1103 is the counter-clockwise angle subtended by the line segment 1109 joining $m_i$ 1103 and the respective reference minutia $m_r$ 1102 with the minutia orientation vector $\phi_i$ 1104.

Thus, each minutia $m_i$ 1103 is now uniquely represented by its (radius 1107, e-angle 1106, t-angle 1105) triplet. The $(r_r, e_r, \theta_r) \equiv (0, 0, 0)$ (i.e., the reference minutiae 810) is discarded and the template fingerprint is now represented by a list of (M-1) triplets of attributes of the template minutia. Similarly, the input fingerprint is now represented by a list of (N-1) triplets of attributes of the input minutia.

FIG. 12 illustrates unquantized values of minutiae attributes computed for an input fingerprint representation 1200 consisting of five minutiae, $m_{1I}, m_{2I}, m_{3I}, m_{4I},$ and $m_{5I}$ (excluding the reference minutia). A vector of all the e-angle attributes are shown in 1210, a vector of all the radii attributes are shown in 1220, and a vector of all the tangles for the five minutiae are shown in 1230.

Figure 13:
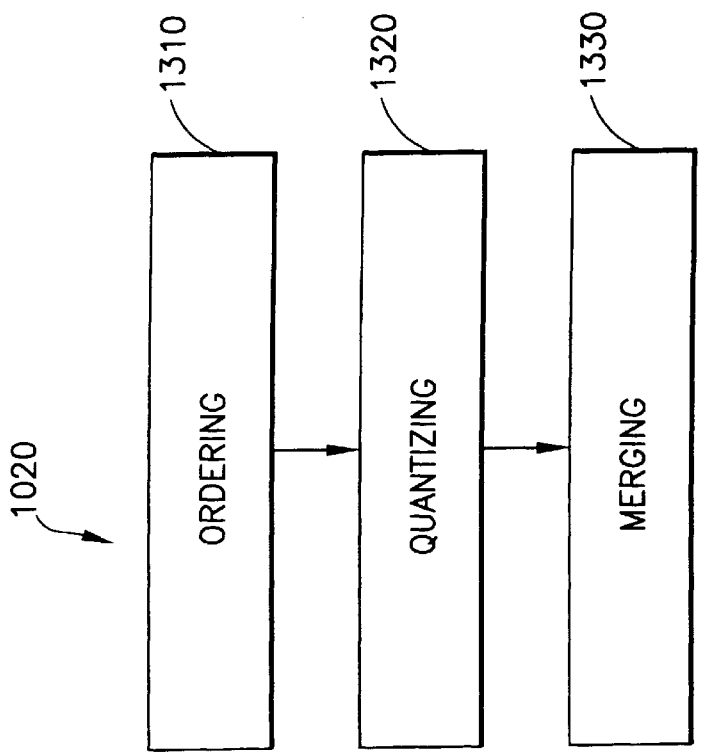
FIG. 13 is a flowchart showing the steps performed by the string representation in FIG. 10.

The process 1020 (FIG. 10) of deriving a string (one-dimensional) representation comprises three steps (see FIG. 13): ordering 1310, quantizing 1320, and merging 1330.

To determine a one-dimensional representation of the fingerprints, the minutia attributes need to be ordered. Ordering makes the comparison between the input and template images more efficient. This is accomplished through an orderer 1310. The ordering could be performed based on the individual minutia attributes or attributes of combinations of minutia. When the individual minutia attributes are used for ordering, there is a need to establish a landmark feature which could be reliably localized in both template and input fingerprints. The landmark feature could be a salient feature of the finger, e.g., delta, core (both commonly known features) etc. or it could be any other feature of the fingerprint which could be reliably and repeatedly extracted in both template and input fingerprints. In a preferred embodiment of the system, the pair of reference minutiae 810 (I,T) in the input and template representation are used as the landmark features. The advantage of using this landmark is that while the features like delta or core might be missing from a fingerprint (or be missed by the imaging or image processing artifacts), a consistent reference minutia 810 could always be located from a list of candidate minutiae sets of template and input fingerprint. In a preferred embodiment, the string representation is derived by ordering a selected minutiae attribute. Specifically, the (M-1) template minutia are ordered by their increasing the (unquantized) e-angle attributes and the (N-1) input minutia are ordered by their increasing the (unquantized) e-angle attributes.

Any ambiguity in the order established by e-angles of the same length is resolved by a next selected attribute, e.g., lengths of (unquantized) radii attributes of the tied minutiae. Note that both e-angles and radii of the two distinct (but spatially close) minutiae could be reduced to the same quantized value for a sufficiently coarse quantization scheme.

Quantizer 1320 quantizes the values of the minutiae attributes into discrete values, i.e., finite integer values. The radius, e-angle, and t-angle are each quantized into $b_r$, $b_e$, and $b_t$ bits, respectively. The quantization scheme could be uniform or non-uniform. In a preferred embodiment, a uniform scheme of quantization is used. For instance, if (unquantized) radius values range from 0 to 511 pixels, $b_r=4$ bits (i.e., 0 to 15 values), then a given unquantized radius value of 300 pixels will be quantized to integer nearest to the the ratio $$300 \times \frac{15}{512} = 8.78,$$

i.e., 9. In the binary scheme, this will represented by 1001.

The merger process 1330 (FIG. 13) consists of (i) aggregation (ii) composition. In aggregation, a minutia representation is derived by aggregating quantized values (step 1320) of its individual attributes (r, e, t). In a preferred embodiment, the bits representing radius, e-angle, and t-angle are concatenated (in that order) so that each minutia is now represented by $b = b_r + b_e + b_t$ bits, i.e., a string of bits. In other words, each minutia is represented by a vector (string) of its quantized and ordered attributes. This is called an aggregate vector, typically 1445. In alternative embodiments, these attributes can be combined in various known ways other than concatenation. These alternative methods of aggregation are within the contemplation of the inventors. Further, the attributes, e.g. the vector 1445, more than one vector 1445, or the entire string 1440 can be compressed.

In composition, the aggregated vectors 1445 of (M-1) template minutiae are put in an order, i.e. a linear order forced by the one dimensionality of the string. In the preferred embodiment, the aggregated 1445 of (M-1) template minutiae are concatenated together, one after another, in the order prescribed by the orderer 1310, e.g. order of increasing radial distances (ties, if any, resolved by their e-angle attributes). Thus (M-1)*b bits represent a template fingerprint consisting M minutiae in one-dimensional string representation and (N-1)*b bits represent an input fingerprint consisting of N minutiae in one-dimensional string representation.

Figure 14:
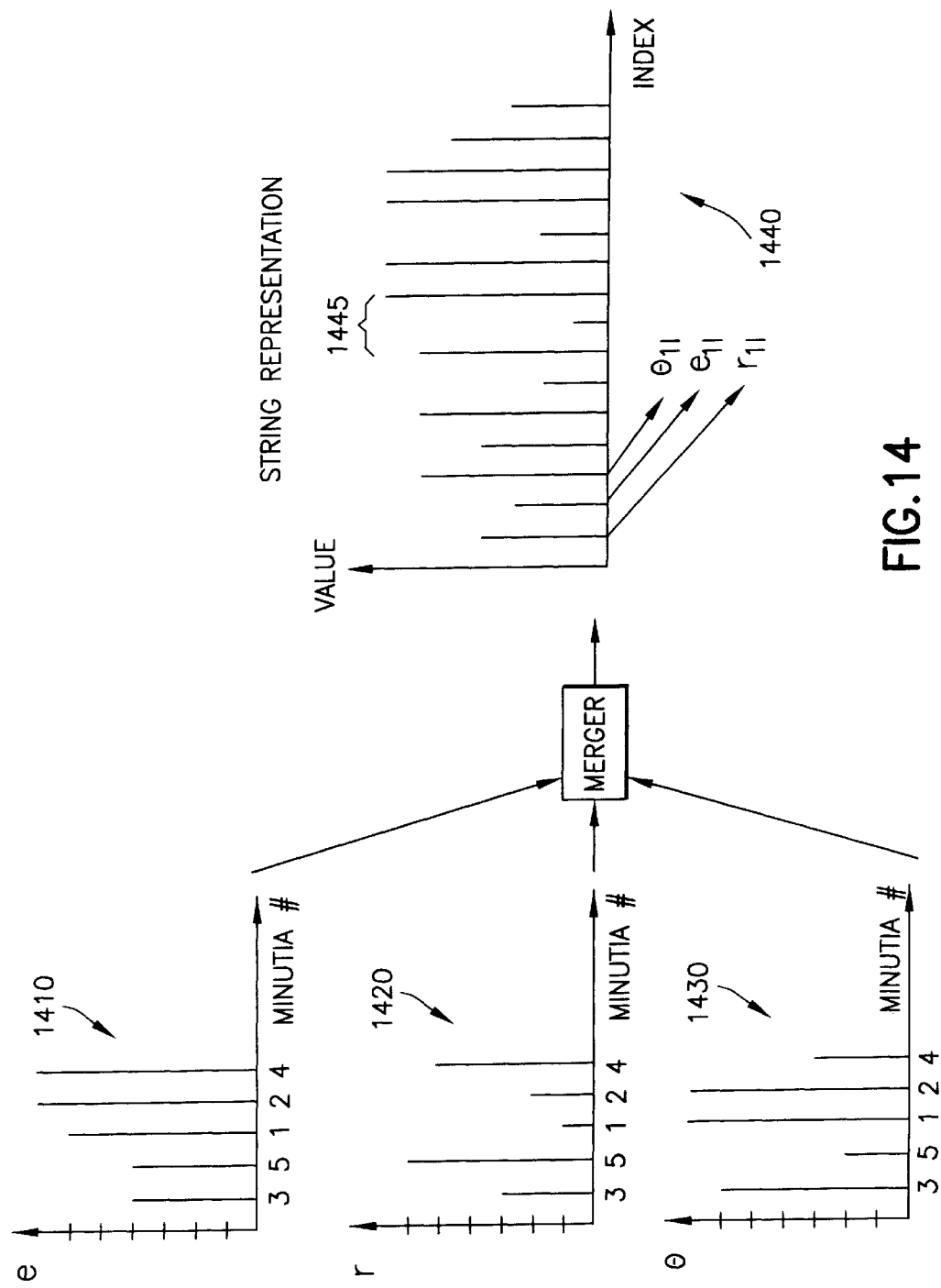
FIG. 14 is a drawing illustrating the string representation of FIG. 13.

FIG. 14 illustrates how vectors of quantized attributes of given minutia are merged to form the one-dimensional representation 1440 of aggregated vectors 1445 for the fingerprint shown in FIG. 12. Ordered and quantized minutia attributes are shown in 1410, 1420, and 1430. When these representations are merged (concatenated together in order) a string representation 1440 is derived.

The linear representation could also be achieved in many other different ways, e.g., by separately/independently ordering the radii attributes of the minutiae, e-angle attributes of the minutiae, and t-angle attributes of the minutiae and then linearly ordering the three individually ordered representations. Or, the linearly ordered representations could be scrambled or compressed for reasons of privacy or storage efficiency. All such methods of linear ordering of the minutiae data are within the contemplation of the inventors and are obvious to those skilled in the art.

The one-dimensional representation of a two-dimensional fingerprint reduces the complexity of matching a two-dimensional pattern. Now, instead of matching a two-dimensional finger, only a one-dimensional pattern (the string representation) needs to be matched. This not only simplifies the matching algorithm but also permits use of many off-the-shelf approximate string matching algorithms to solve the fingerprint matching problem.

The particular one-dimensional string representation proposed has several additional benefits. Minutiae matching in the polar coordinate system has several advantages. Although the deformation of fingerprints depends on a number of factors such as impression pressure and impression direction, the deformation in a local region is usually consistent and it may become less consistent as one moves further away from the region where the fingerprint patterns are consistent (See FIG. 4 and 455/435). Consequently, it is easier to represent and manipulate the representations in polar space with origin at a point of maximal consistency 450/460 (i.e., reference minutiae) between the template and aligned input fingerprint representation. At the same time, it is easier to formulate rotation, which constitutes the main part of the alignment error between an input image and a template image, in the polar space than in the Cartesian space. The symbolic string 1440 (FIG. 14) generated by concatenating points in an increasing order of radial angle in polar coordinates uniquely represents a point/minutiae pattern. Therefore, point/minutiae pattern matching can be achieved with a string matching algorithm.

Figure 17:
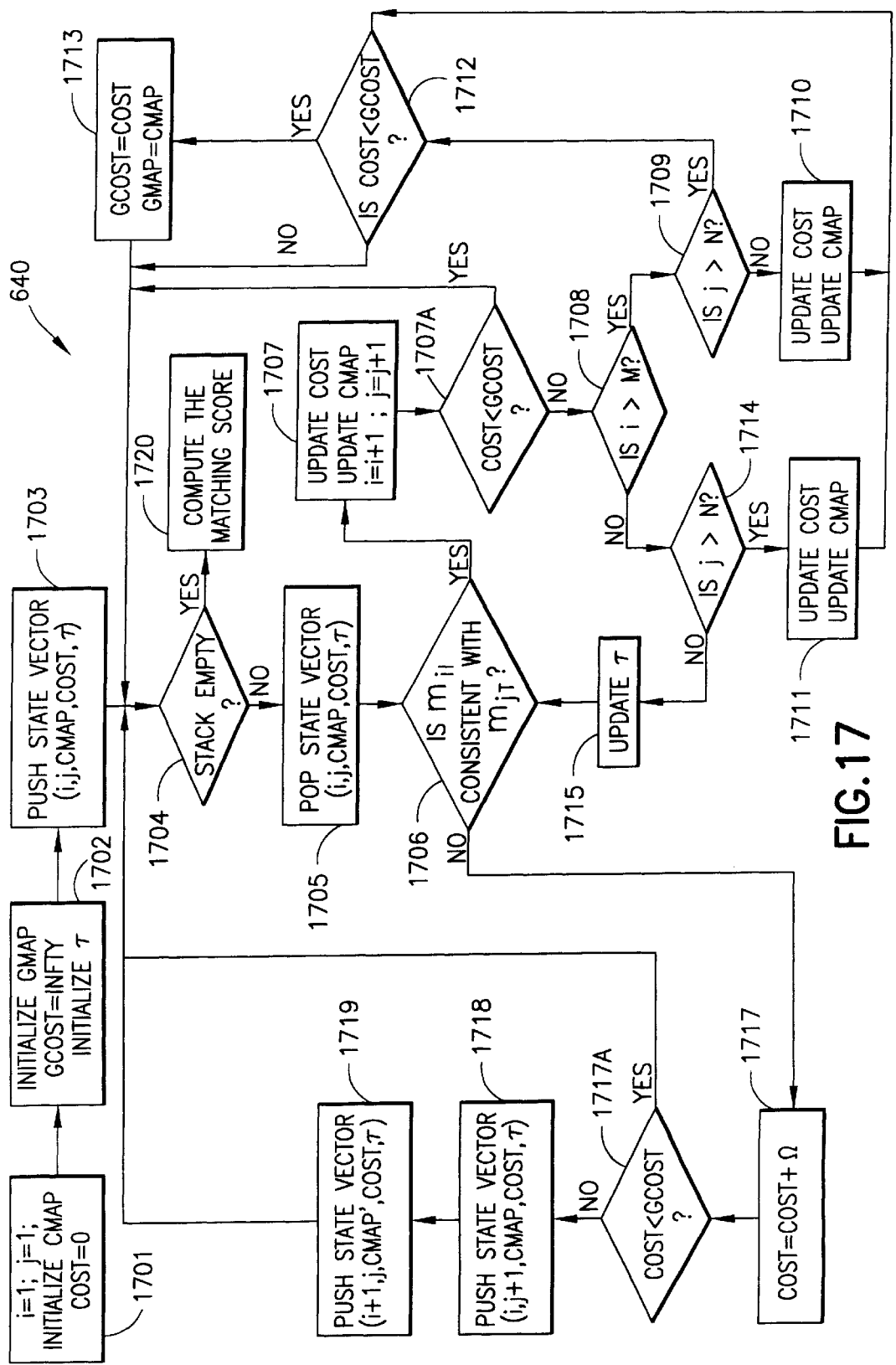
FIG. 17 is a flow chart showing the steps of the matcher of FIG. 6.

The process of matching (640) is described below and is depicted in FIG. 17. The matching algorithm computes a matching score representing the degree of the match between the input and template fingerprints. The higher the matching score, the more likely that the fingerprints were scanned from the same finger.

The matcher adopts the following strategy to match the string representations of the input and template fingerprints. A minutia from the template fingerprint and a minutia from the input fingerprint are said to be corresponding minutiae if they represent an identical minutia on the same finger. Two (template and input) fingerprints scanned from the same finger at different times may not have the same number of minutiae due to any combination of the following reasons: (i) spurious minutiae may be created in the template fingerprint due to, e.g., dirt on the glass platen scanning the finger, artifacts of image processing, cuts or scratches on the fingerprint; (ii) spurious minutiae may be created in the input fingerprint due to, e.g., dirt on the glass platen scanning the finger, artifacts of image processing, cuts or scratches on the fingerprint; (iii) genuine minutiae may not be detected in the template fingerprint due to, e.g., dryness of the finger, artifacts of image processing; and (iv) genuine minutiae may not be detected in the input fingerprint due to, e.g., dryness of finger, artifacts of image processing, insufficient contrast in the imaging.

The objective of the matcher 640 is to determine how many minutiae of the input fingerprint correspond to the minutiae of the template fingerprint, (e.g., represent the same minutiae on the same finger) and compute a score which indicates the number of corresponding minutiae. The determination of the correspondence of the input minutiae to those of the template minutia from their string representation could be performed in a number of ways. Different sets of rules could enforce the matching under the different assumptions mentioned in the "the statement of problems with the prior art" section of this document.

However, in a preferred embodiment, the matcher 640 assigns the correspondence subject to the following novel criteria:

1. Each input minutia must be assigned a matching or non-matching status.
2. A matching input minutia must be assigned to a template minutia whose attributes are consistent with the attributes of the input minutia.
3. The assignment is one-to-one. Note more that one template minutia can correspond to a single input minutia and vice versa.
4. The assignment is order preserving: an assignment of $i^{th}$ input minutia $m_{iI}$ to $j^{th}$ template minutia $m_{jT}$ precludes assignment of any of the successive input minutia (e.g., $m_{(i+1)I}, \ldots, m_{MI}$) to any of the template minutia preceding $j^{th}$ template minutia (e.g., $m_{1T}, \ldots, m_{jT}$).
5. Each assignment of an input minutia $m_{iI}$ to a template minutia $m_{jT}$ is associated with a cost $\omega(i,j)$; each non-matching input minutiae is associated with a cost of $\Omega(i,j)$. The total cost of correspondence determination is sum of the costs associated with each $cmap_i$ decision. The desirability of a correspondence map solution could be (inversely) ordered by the total costs associated with them. The correspondence map associated with the lowest cost is the most desirable solution; when more than one correspondence map exist with minimum total cost, the one of those correspondence maps could be selected based on any other desirability criteria. In a more preferred embodiment, we arbitrarily select one of the many existing solutions.

A number of algorithms could be devised to implement the matchers based on the principles above. The implementation details of one preferred embodiment of our matching algorithm is described using FIG. 17. Others implementations are within the contemplation of the inventors.

We will start with describing various variables and representations.

Figure 16:
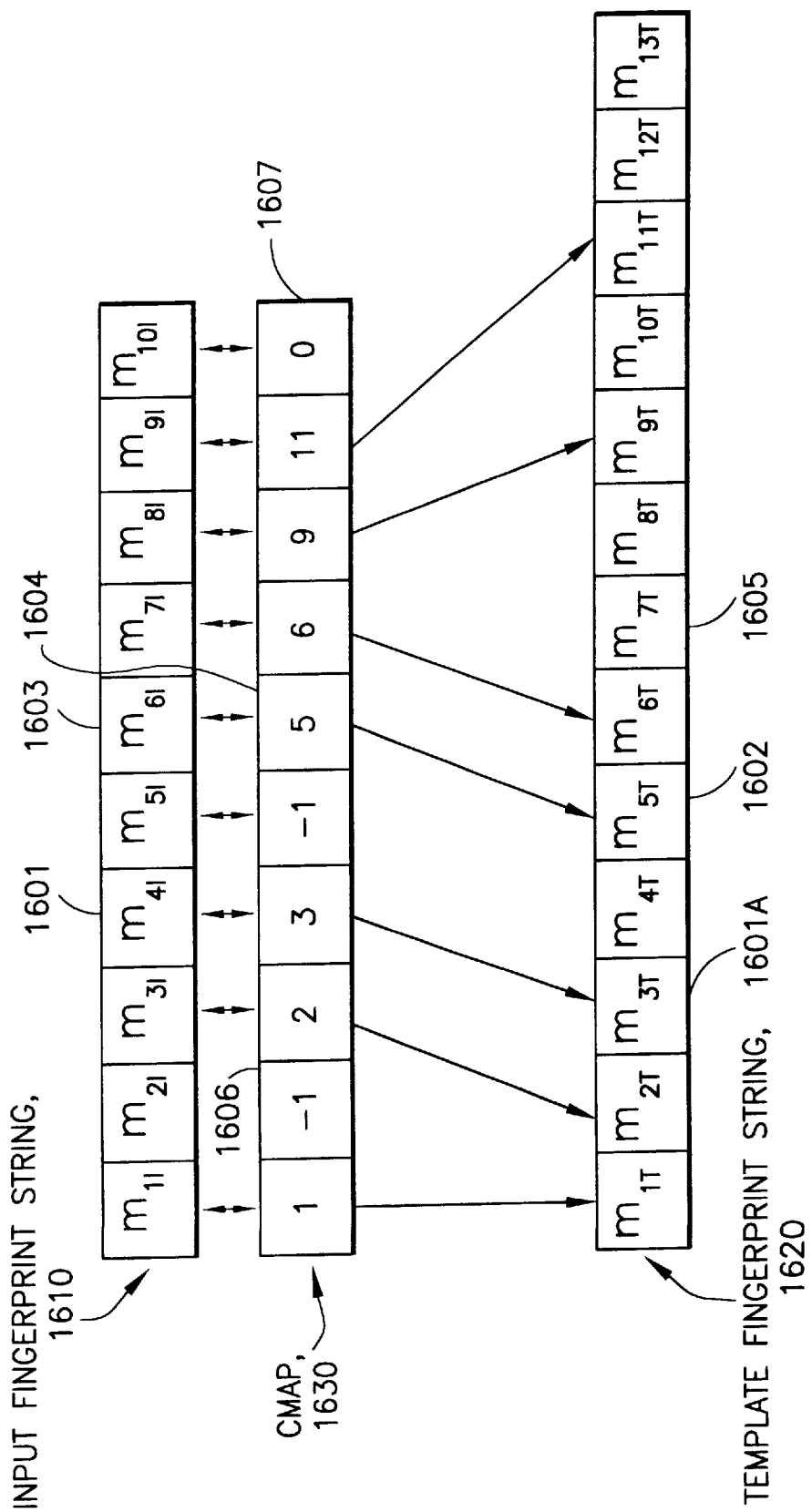
FIG. 16 is a schematic representation of a consistency map.

In one embodiment, the correspondence map 1630, referred to as cmap 1630, e.g., FIG. 16,is a representation that indicates whether each minutia in the template fingerprint has a corresponding minutia in the input fingerprint. In one embodiment, the cmap 1630 representation is an ordered list of indices (typically 1604): $cmap_1$, $cmap_2$, $cmap_3$, ..., $cmap_m$; where the index $cmap_i$ represents correspondence information about of the input minutia $m_i$= $(r_{iI}, e_{iI}, \theta_{iI})$ minutiae in the string representation of the input fingerprint 1610, $P=((r_{1I}, e_{1I}, \theta_{1I}), \ldots, (r_{MI}, e_{MI}, \theta_{MI}))$. In one preferred embodiment, $cmap_i=0(1607)$ indicates the initialized value of $cmap_i$ and that the matcher has not yet considered the corresponding minutia $m_{iI}$ with any minutiae in the template fingerprint; $cmap_i=-1(1606)$ indicates that the matcher considers that the minutia $m_{iI}$ has no corresponding minutia in the template fingerprint and minutia $m_{iI}$ is considered to be a non-matching minutia 1606; for any other (e.g. 1601, 1603) $cmap_i=j(0<j<N)$ indicates that the matcher has assigned a corresponding minutia (1601A for 1601 and 1602 for 1603) to be the minutia $m_{jT}$ of the string representation of the template minutia set 1620, $Q=((r_{1T}, e_{1T}, \theta_{1T}), \ldots, (r_{NT}, e_{NT}, \theta_{NT}))$. Note that in this embodiment, the position in cmap 1630 corresponds to the position in the input fingerprint string 1610 and the contents in a given position in cmap 1630 corresponds to the position of the matching template minutia in the template fingerprint string 1620. Further, minutia $m_{iI}$ is considered to be a matching minutia (rather than a non-matching), i.e., matching some minutia $m_{jT}$ in the template, when the contents of the given position in cmap is greater than zero.

Now referring to FIG. 17, the matcher process 640 uses a gmap which is a global correspondence map which stores the most desirable solution for the correspondence map cmap found so far. (Note that gmap is formulated as is cmap) The variables cost and gcost are used for storing the present cost of the cmap assignments and the cost of the most desirable solution found so far (gmap). Indices i, and j are the indices identifying the present input and template minutia being considered for a match by the matcher 640. The variable τ describes the set of tolerance thresholds and consists of upper (initialized in the range of 6 to 10 pixels) and lower (initialized in the range of −6 to −10 pixels) radius tolerance thresholds, upper (initialized in the range of 1.5 to 3 degrees) and lower (initialized in the range of −1.5 to −3 degrees) e-angle tolerance thresholds , and t-angle tolerance threshold (initialized in the range of 20 to 40 degrees).

The state of an unfinished correspondence solution which could potentially result in a complete feasible solution search can be completely determined by the values of i, j, cmap, cost, and the threshold parameter set, τ. A data structure status vector (i,j, cmap, cost, τ) is used to store the state of an unfinished potentially feasible correspondence solution (UPFS). The matcher algorithm 640 has several UPFS searches in progress at a time. The matcher 640 pursues only one UPFS search actively and the rest of the inactive UPFS searches are deferred until either the matcher search for the feasibility of the current solution is successful or unsuccessful. A stack mechanism is used for keeping track of the information on the status of the UPFS searches. When matcher has more than one (e.g., n>1) choice of solutions to pursue, it pushes the status vectors, e.g., (i,j, cmap, cost, τ), of the (n−1) choices on the stack and continues with the remaining choice of the search for feasible solution.

Figure 15:
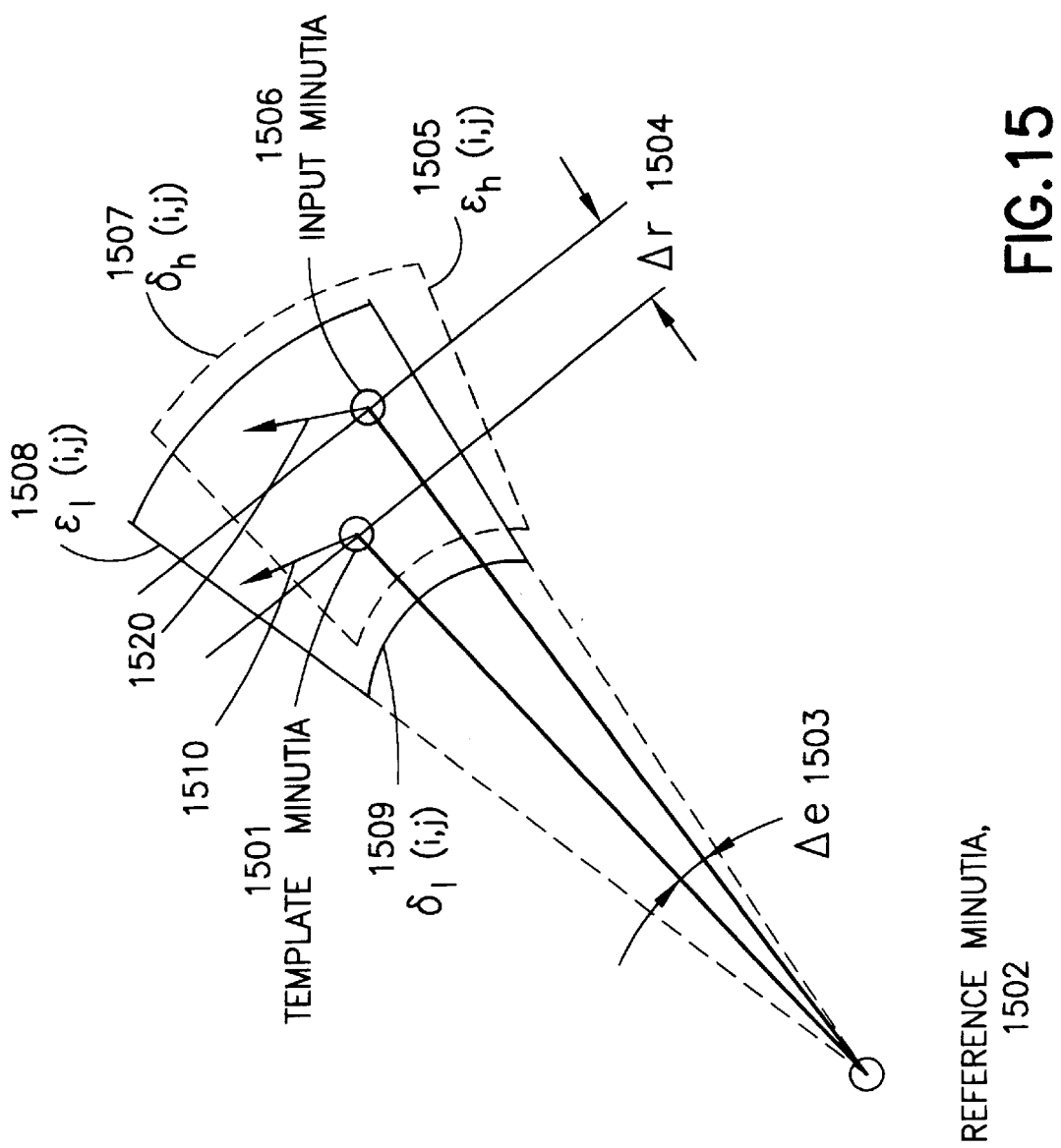
FIG. 15 is a drawing illustrating the boundary conditions for matching two minutiae.

In step 1701, some of the variables used in the matcher algorithm are initialized. i and j are set to 1 indicating that the matcher starts out considering the matching first minutia in the input fingerprint representation with the first minutia in the template representation. The cost of the present solution is initialized to zero. The consistency map indices are initialized to 0 indicating that none of the matching or non-matching decisions have been yet considered. In step 1702, more of the matcher algorithm variables are initialized. The global consistency map, gmap is initialized similar to way that cmap is initialized. The cost of the present feasible solution is set to a maximum positive value (infinity) so that any first feasible solution would be acceptable to the system. In a preferred embodiment (referring to FIG. 15), the various parameters in τ were set to the following values: $\delta_l(0,0)=-8$ pixels 1509, $\delta_h(0,0)=+8$ pixels 1507, for the range of an acceptable r attribute; $\epsilon_l(0,0)=-2.5$ degrees 1508, $\epsilon_h(0,0)=+2.5$ degrees 1505, for the range of an acceptable e-angle attribute; and ρ=30 degrees in either direction for an acceptable t-angle attribute. The parameters (explained below) used to determine the incremental cost of a given pair of minutiae are α set in the range of 0 to 5, preferably set to 1.0, β, set in the range of 0 to 5, preferably set to 2.0, γ set in the range of 0 to 5, preferably set to 0.1, Ω=200(α+β+γ) set in the range of 0 to 3000, preferably set to 620, and η set in the range of 0 to 1, preferably set to 0.5.

In step 1703, the matcher 640 pushes the initialized information of the search for a feasible solution on to the stack.

In step 1704, the matcher 640 verifies if the stack is empty. If the stack is indeed empty, all possible feasible correspondence solutions between input minutia set and the template minutia set have been examined and the matcher computes the matching core in step 1720 gmap contains the most desirable solution with a cost gcost. The matching score is computed in step 1720 from gmap by simply counting the number of positive indices, i.e., the positive positions in gmap.

If in step 1704, the stack is not found to be empty, there are more correspondence solutions between input minutia set and the template minutia set to be examined and the matcher explores the unfinished correspondence solution popping 1705 the state vector (i,j, cmap, cost, τ) from the stack.

In step 1705, the matcher pops the top of the stack to get the status vector (i,j, cmap, cost, τ) to examine an unfinished correspondence solution.

The exploration starts with examining the consistency 1706 of the correspondence of the $i^{th}$ input minutia with $j^{th}$ template minutia.

The consistency/feasibility of a proposed correspondence 1706 between a given pair of minutia from the input and template fingerprints is a determination if the attributes of the pair are within the tolerances specified in τ. We will first describe this step in detail followed by a closely associated process of updating 1715 the various thresholds, τ.

Suppose that a input minutia $m_{iI}$ and template minutia $m_{jT}$ are represented in their respective string representations as $(r_{iI}, e_{iI}, \theta_{iI})$ and $(r_{jT}, e_{jT}, \theta_{jT})$ respectively; suppose also that $m_{iI}$ and $m_{jT}$ are hypothesized to be corresponding minutiae, i.e., representing an identical minutia on a finger. The hypothesis is tentatively either accepted or rejected based on the inconsistency measures computed for their radius, e-angle, and t-angle attributes. The radii, e-angle, and t-angle inconsistency measures for minutiae $m_{iI}$ and $m_{jT}$ will be denoted by $(c^r(i,j), c^e(i,j), c^t(i,j))$. If radius, e-angle, and t-angle inconsistencies of the minutiae $m_{iI}$ and $m_{jT}$ are within specified tolerance thresholds, the correspondence hypothesis for the minutiae $m_{iI}$ and $m_{jT}$ is tentatively accepted. Otherwise, the correspondence hypothesis for the minutiae $m_{iI}$ and $m_{jT}$ is rejected. Tentative rejection of the correspondence hypothesis for the minutiae $m_{iI}$ and $m_{jT}$ is associated with a rejection penalty score $(\Omega(i,j))$. Tentative acceptance of the correspondence hypothesis for the minutiae $m_{iI}$ and $m_{jT}$ is associated with a acceptance penalty score $(\omega'(i,j))$. In some embodiments, both the rejection and acceptance penalty score depend on the minutia attributes, the matching context, or application context. In some other embodiments, they could be set to a constant value. In a preferred embodiment of our system, the rejection penalty score was set to a constant value $(\Omega(i,j)=\Omega$ set in the range 0 to 3000, preferably to 620), while the acceptance penalty score was made minutiae attribute dependent. The acceptance penalty score was more when the (radius, e-angle, and t-angle) attribute inconsistency measures of the minutia $m_{iI}$ and $m_{jT}$ were less consistent and was made equal to the weighted sum of the radius inconsistency, e-angle inconsistency, and t-angle inconsistency. More specifically, the acceptance penalty score was set to $$\omega'(i,j) = \alpha \times c^r(i,j) + \beta \times c^e(i,j) + \gamma \times c^t(i,j)$$

where $c^r(i,j)$, $c^e(i,j)$, and $c^t(i,j)$ are radius, e-angle, and t-angle inconsistencies, respectively, and α, β, and γ are their corresponding weights, as described above.

The radius inconsistency is measured by the disparity of lengths 1504 of radii of minutiae $m_{iI}$ and $m_{jT}$ in their string representations. More specifically, the $c^r(m,n)$ depends on $\lambda^r(i,j)$:

$$\lambda^r(i,j) = r_{iI} - r_{jT}$$

$$c^r(i,j) = \lambda^r(i,j)$$

if $$\delta_l(i,j) < \lambda^r(i,j) < \delta_h(i,j)$$

else radii are considered to be outside the range of tolerance thresholds and are deemed inconsistent; $\delta_l(i,j)$ and $\delta_h(i,j)$ are lower and higher radius consistency tolerance thresholds. In other words, the inconsistency of the radii for minutia $m_{iI}$ $m_{jT}$ is $\lambda^r(i,j)$ if the difference in the lengths of the radii is within the radius tolerance thresholds $\delta_l(i,j)$ and $\delta_h(i,j)$ otherwise, the minutiae are considered to be inconsistent.

Let e-angles of minutiae $m_{iI}$ and $m_{jT}$ in their string representations be $e_{iI}$ and $e_{jT}$, respectively. The e-angle inconsistency of the minutia $m_{iI}$ and $m_{jT}$ depend on the half-angle between $e_{iI}$ and $e_{jT}$. Let $\lambda^e(i,j)$ is the half angle between $e_{iI}$ and $e_{jT}$., then $$c^e(i,j) = \lambda^e(i,j).$$

if $$\epsilon_l(i,j) < \lambda^e(i,j) < \epsilon_h(i,j)$$

else e-angles are considered to be outside the range of tolerance thresholds and are deemed inconsistent; $\epsilon_l(i,j)$ and $\epsilon_h(i,j)$ are lower and higher e-angle consistency tolerance thresholds. In other words, the inconsistency of the for minutia $m_{iI}$ $m_{jT}$ is $\lambda^e(i,j)$ if the half-angle between their e-angles is within the e-angle tolerance threshold range $\epsilon_l(i,j)$ and $\epsilon_h(i,j)$ otherwise, the minutiae are considered to be inconsistent.

Let t-angles of minutiae $m_{iI}$ and $m_{jT}$ in their string representations be $\theta_{iI}$ and $\theta_{jT}$, respectively. The e-angle inconsistency of the minutia $m_{iI}$ and $m_{jT}$ depend on the half-angle between $\theta_{iI}$ and $\theta_{jT}$. Let $\lambda^t(i,j)$ is the half angle between $\theta_{iI}$ and $\theta_{jT}$., then $$c^t(i,j) = \lambda^t(i,j)$$

if $$\lambda^t(i,j) < \rho(i,j)$$

else t-angles are considered to be outside the range of tolerance thresholds and are deemed inconsistent; $\rho(i,j)$ is t-angle consistency tolerance threshold.

The consistency tolerance threshold set τ, (e.g., radius, e-angle, and t-angle consistency thresholds) could either be fixed before hand, data dependent (how well the minutiae attributes are consistent), context dependent (how many minutiae matched prior), application dependent (e.g., security applications might have smaller tolerances than non-security applications), or a combination of any of these. In one embodiment of our system, all the tolerances were made context and data dependent, i.e., the tolerance values depended upon the state of the matching algorithm and the values of minutia attributes. In a preferred embodiment of the system, the e-angle consistency tolerance threshold $\rho(i,j)$ was set to a constant; radial and e-angle consistency tolerance thresholds ($\epsilon_l(i,j)$, $\epsilon_h(i,j)$, $\delta_h(i,j)$, and $\delta_l(i,j)$) were made matcher context dependent as well as minutia dependent.

More specifically, radial and e-angle consistency tolerance thresholds ($\epsilon_l(i,j)$, $\epsilon_h(i,j)$, $\delta_h(i,j)$, and $\delta_l(i,j)$) depend upon how many (and which) minutiae are currently matched in the present solution; these thresholds are also dependent on the position of the minutia within the string representation. Consequently, values of tolerance thresholds need to be updated each time a given pair of template and input minutiae are considered to be sufficiently consistent to be corresponding minutiae 1715.

Figure 4:
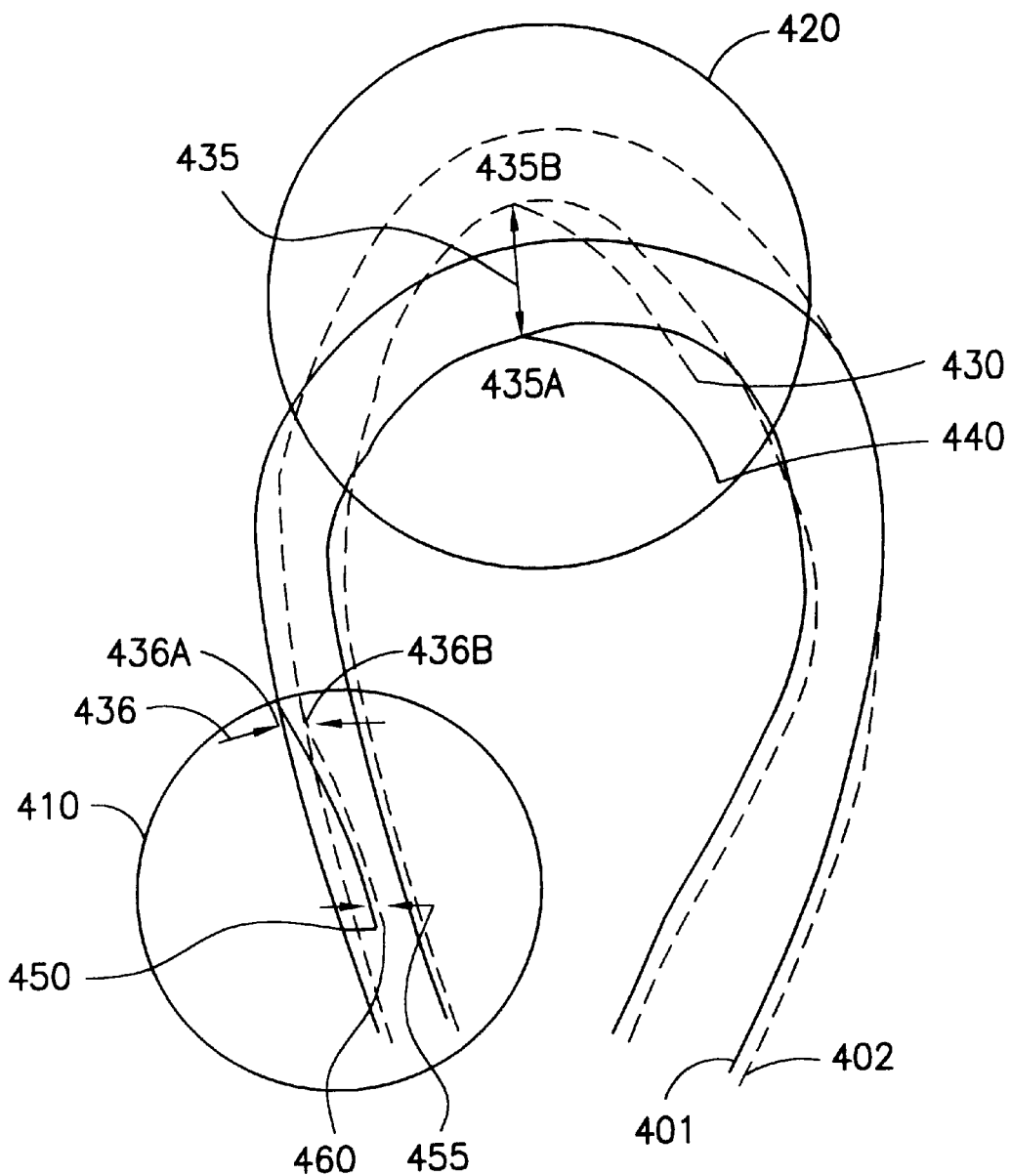
FIG. 4 illustrates a typical prior art (problem) situation of aligned ridge structures of two fingerprints.

For example, in FIG. 4, the tolerances are increased as as the ridge is traverse (moving along the string representation) from point 460 to point 436 and later to point 435 to compensate for the increased separation of the ridges.

More specifically, the radial and e-angle consistency thresholds are updated incrementally and adaptively as more and more minutiae are matched. In a preferred embodiment, these thresholds are updated according to the following expressions:

$$\delta_l(i+1,j+1) = \delta_l(i,j) + \eta \Delta r_a$$

$$\delta_h(i+1,j+1) = \delta^h(i,j) + \eta \Delta r_a$$

$$\epsilon_l(i+1,j+1) = \epsilon_l(i,j) + \eta \Delta e_a$$

$$\epsilon_h(i+1,j+1) = \epsilon_h(i,j) + \eta \Delta e_a$$

where η is the tolerance adjustment parameter given above and $\Delta r_a$ and $\Delta e_a$ are respective differences in the radius and e angle attributes for the prior processed pair of minutiae.

In a preferred embodiment of our system, the various parameters were set to the following values: $\delta_l(0,0)=-8$ pixels, $\delta_h(0,0)=+8$ pixels, $\epsilon_l(0,0)=-2.5$ degrees, $\epsilon_h(0,0)=+2.5$ degrees, $\rho=30$ degrees, $\beta=2.0$, $\gamma=0.1$, $\Omega=200(\alpha+\beta+\gamma)$, and $\eta=0.5$. See FIG. 15 describing qualitatively the threshold parameters.

In step 1707, the present cost correspondence is incremented by the $\omega'(i,j)$ value; $cmap_i$ is assigned j (the j th template minutia) and both i and j are incremented.

In step 1707A the cost is compared with the current gcost. If greater than the gcost, the process 640 returns to step 1704 to check the stack and initiate the next search for a feasible solution. This is because the cost of the current solution is greater than the most desirable solution found so far, gcost.

If the cost is less than gcost, the process 640 determines whether there are any input minutiae remaining to be matched in the present solution (the input string) 1708. If there are more, a similar check is made about the template minutia/string 1714. In case there are more template minutia/e to be matched, the matcher 640 proceeds to update the thresholds 1715 as described above and then returns to step 1706.

If in step 1714, there are no more template minutiae to be matched, the cost of the present solution is penalized by a cost proportional to the remaining input minutia unmatched; specifically, by an increment of $(M-i+1)\times\Omega$ The matcher then returns to step 1712.

In step 1708, if there are no more input minutiae to be matched, i.e., i>M, the matcher checks if there are any more template minutiae to be matched (step 1709). If there are more template minutiae remain to be matched j<N), the cost of the present solution is penalized 1710 by a cost proportional to the remaining template minutia unmatched. In a preferred embodiment, the incremental penalty is $(N-j+1)\times\Omega$.

The matcher then returns to step 1712.

If in step 1709, the matcher finds that there are no more template minutiae (j>N) to be matched, the matcher 640 returns to step 1712 uneventfully.

In step 1712, the matcher verifies if the cost of the present correspondence solutions is smaller than the minimum cost (most desirable) solution found so far. If the cost of the present solution is indeed smaller than the cost gcost of the most desirable solution for the correspondence (gmap) found so far, then the present solution cmap replaces 1713 gmap and the present cost, cost, replaces 1713 the gcost, the cost of the most desirable solution. The matcher then proceeds to find if there are any other solutions to be explored which may be more desirable than the most desirable solution found so far (step 1704).

If, in step 1706, the matcher finds the proposed pair of template minutia $m_{jT}$ and the input minutia $m_{iI}$ to be inconsistent, the process 640 branches to step 1717. In step 1717, the cost of the present solution is penalized by $\Omega$.

In step 1717A, the cost is compared to gcost as in step 1707A. If the cost is greater than the gcost, the process returns to step 1704 to check the stack. If the cost is less than the gcost, the process continues to step 1718.

In steps 1718 and 1719, the matcher 640 explores two alternatives: process 640 could consider matching the (j+1) th template minutia with the i th minutia of the input fingerprint or it could consider matching the (j) th template minutia with the (i+1) th minutia of the input fingerprint. These two alternatives are indicated by storing (i,j+1,cmap, cost, $\tau$) and (i+1,j, cmap', cost, $\tau$) on the stack (steps 1718 and 1719, respectively). The consistency map, cmap', is derived from cmap as follows: replicate all the indices of the cmap into cmap' and further setting $i^{th}$ element of cmap to zero indicating that $i^{th}$ input minutia is non-matching ($cmap_i=-1$). After step 1719, the matcher returns to step 1704 to pursue the topmost choice on the stack. Therefore, both alternatives are pursued because they are both pushed on the stack.

In a preferred embodiment, the computation/representation of cmap could be altogether eliminated for the reasons of storage and computational efficiency. The matching score is updated instead of the consistency map, cmap, in steps requiring update of cmap (steps 1718, 1719, 1711, 1710, 1707) and the score is initialized to zero in step 1701 instead of initializing cmap. Similarly, the matching algorithm could be more efficiently implemented without use of stack and conversion of the matcher algorithm without stack is obvious to those skilled in the art.

Alternatively, the cost of the most feasible solution (gcost or C(M,N)) could be recursively and tersely described as follows using the following mathematical expressions:

the gcost =

$$C(i,j)=\min(C_1(i,j), C_2(i,j), C_3(i,j))$$

where $$C_1(i,j)=C(i-1,j)+\Omega$$

$$C_2(i,j)=C(i,j-1)+\Omega$$

$$C_3(i,j)=C(i-1,j-1)+\omega'(i,j)$$

Where C(i,j) describes the most feasible cost of matching first i input and first j template minutiae. $\Omega$ is incremental rejection penalty score. $\omega'(i,j)$ is the incremental acceptance penalty cost depending upon the consistency of the attributes of the input minutia i and the template minutia j as well as the current consistency tolerance thresholds.

Referring back to FIG. 6, the normalizer (650) converts the matching score into normalized matching score. The matching score represents number of minutiae matched between the input and the template fingerprint. This matching score can be directly used for determining whether the fingerprints are "mates" in many applications, e.g., in forensic applications, a fixed number of minutiae matching is sufficient evidence for a match.

In many other contexts, though, the matching score is not a desirable way of comparing the fingerprint similarity. The normalizer (650) converts the matching score into normalized matching score. The normalization step, brings the matching score into a single scale so that all matching scores have a common basis for comparison. The Normalizer 650 uses the matching score between P and Q to establish the correspondence of the minutiae between P and Q. The normalized matching score, S, is then computed as:

$$S = 100M' \times \frac{M'}{(M \times N)},$$

where M' is the matching score generated by the matcher 640; M and N are the number of minutia extracted from the template and input fingerprints.

The various thresholds used in this process could be predetermined based on the statistical properties of the image population or could be adaptively determined for each image based upon any image properties (for instance, the signal to noise ratio) of that particular image. The thresholds could also be adaptively augmented to include the image quality, image intensity, and image brightness factor. The magnitude of the various thresholds recommended in this document were order of magnitude estimates. But the actual threshold could be more liberal or conservative depending upon the application context.

Estimated orientation of minutiae are often inaccurate in fingerprint images of poor quality. Our algorithm accommodates noise in the minutiae orientations by permitting large discrepancy between the corresponding minutiae (up to 30 degrees) by tolerating the upto 30 degrees of inconsistency in the corresponding template and input minutiae orientations.

Given this disclosure alternative equivalent embodiments will become apparent to those skilled in the art. These embodiments are also within the contemplation of the inventors.

What is claimed is:

1. A system for determining a correspondence between two or more images, comprising:
    a computer having one or more central processing units (CPUs) and a memory;
    a first image stored in the memory, the first image having one or more first sets of one or more first points, one or more of the first points in each of the first sets located on a respective first curved line;
    one or more second images stored in the memory, the second image having one or more second sets of one or more second points, one or more of the second points in each of the second sets located on a respective second curved line;
    a reference point matcher, executed by the CPU, that determines a correspondence between a first reference point and a second reference point, the first reference point being one of the first points and the second reference point being one of the second points;
    a string representor, executed by the CPU, that represents the first image in as a first string of first tuples with a linear first order and represents the second image in as a second string of second tuples with a linear second order, each first tuple associated with one of the first points, each second tuple associated with one of the second points, the first tuples having first attributes determined by a first relationship between the first reference point and the respective first point, and the second tuples having second attributes determined by a second relationship between the second reference point and the respective second point, the first order being the same as the second order and the first relationship being the same as the second relationship; and
    a matcher that determines that the first and second image match using a score determined by a minimum cost of the combined incremental cost associated with each pair of first and second tuples.

2. A system, as in claim 1, where the minimum cost is the sum of the incremental costs of the pairs of first tuples that match second tuples.

3. A system, as in claim 2, where the minimum cost is further determined by adding an incremental penalty cost for each pair of first and second tuples that do not match.

4. A system, as in claim 3, where the incremental penalty cost is greater than the incremental cost.

5. A system, as in claim 2, where one of the first tuples matches one of the second tuples when the first and second tuples are consistent.

6. A system, as in claim 5, where the tuples are consistent and all of respective attributes of the tuples are within an attribute tolerance.

7. A system, as in claim 6, where the attribute tolerance varies to provide an adaptive consistency measure.

8. A system, as in claim 7, where one or more attribute tolerances vary as determined by a difference of one or more attributes of one or more pairs of first and second tuples that were match previously.

9. A system, as in claim 2, where a pair of first and second tuples that match are removed from consideration in future matches.

10. A system, as in claim 2, where one of the first tuples does not match one of the second tuples when the first and second tuples are inconsistent and the inconsistent pair of first and second tuples is given a penalty cost.

11. A system, as in claim 2, where the first tuple is chosen in the first order and the second tuple is chosen in the second order and the position of the second tuple in the second order in greater than or equal to the position of the first tuple in the first order.

* * * * *